US012375243B2

(12) United States Patent
Abdelghaffar et al.

(10) Patent No.: US 12,375,243 B2
(45) Date of Patent: Jul. 29, 2025

(54) REPETITION AND TIME DOMAIN COVER CODE BASED SOUNDING REFERENCE SIGNAL RESOURCES FOR ANTENNA SWITCHING

(71) Applicant: QUALCOMM Incorporated, San Diego, CA (US)

(72) Inventors: Muhammad Sayed Khairy Abdelghaffar, San Jose, CA (US); Alexandros Manolakos, Escondido, CA (US); Runxin Wang, San Diego, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 432 days.

(21) Appl. No.: 17/758,458

(22) PCT Filed: Feb. 5, 2020

(86) PCT No.: PCT/CN2020/074324
§ 371 (c)(1),
(2) Date: Jul. 6, 2022

(87) PCT Pub. No.: WO2021/155505
PCT Pub. Date: Aug. 12, 2021

(65) Prior Publication Data
US 2023/0163912 A1    May 25, 2023

(51) Int. Cl.
*H04L 5/00* (2006.01)
*H04B 7/06* (2006.01)
*H04L 1/08* (2006.01)

(52) U.S. Cl.
CPC .............. *H04L 5/0051* (2013.01); *H04L 1/08* (2013.01); *H04L 5/0078* (2013.01); *H04B 7/0686* (2013.01)

(58) Field of Classification Search
CPC ....... H04L 5/0051; H04L 5/0078; H04L 1/08; H04B 7/0686
See application file for complete search history.

(56) References Cited

U.S. PATENT DOCUMENTS

2019/0281588 A1*  9/2019  Zhang .................. H04B 7/0617
2019/0319692 A1  10/2019  Noh et al.
(Continued)

FOREIGN PATENT DOCUMENTS

CN    109845166 A    6/2019
CN    109995491 A    7/2019
(Continued)

OTHER PUBLICATIONS

Qualcomm Incorporated: "Discussion on SRS Enhancement", 3GPP TSG-RAN WG1 Meeting #103-e, R1-2009255, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020, XP051946918, 32 Pages.
(Continued)

*Primary Examiner* — Kent Krueger
(74) *Attorney, Agent, or Firm* — Paul M. McAdams; Holland & Hart LLP

(57) ABSTRACT

Methods, systems, and devices for wireless communications are described. A user equipment (UE) may use cover coding for sounding reference signal (SRS) resources for performing antenna switching. The UE may receive a configuration for a reference signal resource set for transmitting a reference signal for antenna switching, the configuration including an indication of a type of time division cover coding for repetitions of the reference signal and an indication of a type of frequency hopping. The UE may determine a reference signal resource for transmission of the reference signal based on the configuration and the type of frequency hop-
(Continued)

ping. The UE may then transmit a set of repetitions of the reference signal over the determined reference signal resource according to the type of time division cover coding.

26 Claims, 19 Drawing Sheets

(56) References Cited

U.S. PATENT DOCUMENTS

| | | | |
|---|---|---|---|
| 2019/0349964 A1* | 11/2019 | Liou | H04B 7/0626 |
| 2020/0028638 A1 | 1/2020 | Liu et al. | |
| 2020/0366439 A1 | 11/2020 | Choi et al. | |
| 2022/0116089 A1* | 4/2022 | Khoryaev | H04B 7/043 |
| 2022/0210803 A1* | 6/2022 | Liu | H04L 1/08 |

FOREIGN PATENT DOCUMENTS

| | | |
|---|---|---|
| CN | 115136685 A | 9/2022 |
| EP | 3471321 A1 | 4/2019 |
| EP | 3734884 A1 | 11/2020 |
| EP | 4080957 A1 | 10/2022 |
| WO | WO-2018127171 A1 | 7/2018 |
| WO | WO-2018226411 A1 | 12/2018 |
| WO | WO-2019098712 A1 | 5/2019 |
| WO | WO-2019103560 A1 | 5/2019 |
| WO | WO-2019164309 A1 | 8/2019 |

OTHER PUBLICATIONS

International Search Report and Written Opinion—PCT/CN2020/074324—ISA/EPO—Oct. 26, 2020.
Qualcomm Incorporated: "Lower PAPR Reference Signals", R1-1903468, 3GPP TSG-RAN WG1 Meeting #96, Lower PAPR Reference Signals, 3rd Generationpartnership Project (3GPP), Mobile Competence Centre; 650, Route Des Lucioles; F-06921 Sophia-Antipolis Cedex; France, vol. RAN WG1, No. Athens, Greece; Feb. 25, 2019-Mar. 1, 2019, Feb. 27, 2019 (Feb. 27, 2019), pp. 1-25, XP051601133, Retrieved from the Internet: URL: http://www.3gpp.org/ftp/tsg%5Fran/WG1%5FRL1/TSGR1%5F96/Docs/R1%2D1903468%2Ezip [retrieved on Feb. 27, 2019], p. 12, paragraph 4—p. 13, paragraph5; figure 13.
Supplementary European Search Report—EP20917732—Search Authority—The Hague—Sep. 22, 2023.

* cited by examiner

REPETITION AND TIME DOMAIN COVER CODE BASED SOUNDING REFERENCE SIGNAL RESOURCES FOR ANTENNA SWITCHING

CROSS REFERENCE

The present Application is a 371 national stage filing of International PCT Application No. PCT/CN2020/074324 by ABDELGHAFFAR et al. entitled "REPETITION AND TIME DOMAIN COVER CODE BASED SOUNDING REFERENCE SIGNAL RESOURCES FOR ANTENNA SWITCHING," filed Feb. 5, 2020; which is assigned to the assignee hereof, and which is expressly incorporated by reference in its entirety herein.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a UE may transmit a sounding reference signal (SRS) to a base station. The base station, upon receiving the SRS, may perform uplink or downlink channel estimation. For example, a UE having multiple antennas may support a different number of transmit antennas than receive antennas, and may transmit reference signals according to an antenna switching process to provide channel estimation for each antenna. SRS using antenna switching may enable downlink beamforming by utilizing channel reciprocity, and may also be used for uplink scheduling and beamforming. In some cases, limitations on reference signal resources may limit scheduling flexibility of reference signals or other signals.

SUMMARY

The described techniques relate to improved methods, systems, devices, and apparatuses that support repetition and time domain cover code based sounding reference signal resources for antenna switching. Generally, the described techniques provide for a user equipment (UE) using cover coding for reference signal (e.g., sounding reference signal (SRS)) resources for performing antenna switching. The UE may receive, from a base station, a configuration for a reference signal resource set for transmitting a reference signal for antenna switching. The configuration information from the base station may include an indication of a type of time division cover coding for the UE to use for repetitions of the reference signal and an indication of a type of frequency hopping. The UE may determine a reference signal resource for transmission of the reference signal based on the configuration and the type of frequency hopping receives in the configuration from the base station. The UE may then transmit a set of repetitions of the reference signal over the determined reference signal resource according to the type of time division cover coding, as part on an antenna switching process.

A method of wireless communications is described. The method may include receiving a configuration for a reference signal resource set for transmitting a reference signal for antenna switching, the configuration including an indication of a type of time division cover coding for repetitions of the reference signal and an indication of a type of frequency hopping, determining a reference signal resource for transmission of the reference signal based on the configuration and the type of frequency hopping, and transmitting a set of repetitions of the reference signal over the determined reference signal resource according to the type of time division cover coding.

An apparatus for wireless communications is described. The apparatus may include a processor, memory coupled with the processor, and instructions stored in the memory. The instructions may be executable by the processor to cause the apparatus to receive a configuration for a reference signal resource set for transmitting a reference signal for antenna switching, the configuration including an indication of a type of time division cover coding for repetitions of the reference signal and an indication of a type of frequency hopping, determine a reference signal resource for transmission of the reference signal based on the configuration and the type of frequency hopping, and transmit a set of repetitions of the reference signal over the determined reference signal resource according to the type of time division cover coding.

Another apparatus for wireless communications is described. The apparatus may include means for receiving a configuration for a reference signal resource set for transmitting a reference signal for antenna switching, the configuration including an indication of a type of time division cover coding for repetitions of the reference signal and an indication of a type of frequency hopping, determining a reference signal resource for transmission of the reference signal based on the configuration and the type of frequency hopping, and transmitting a set of repetitions of the reference signal over the determined reference signal resource according to the type of time division cover coding.

A non-transitory computer-readable medium storing code for wireless communications is described. The code may include instructions executable by a processor to receive a configuration for a reference signal resource set for transmitting a reference signal for antenna switching, the configuration including an indication of a type of time division cover coding for repetitions of the reference signal and an indication of a type of frequency hopping, determine a reference signal resource for transmission of the reference signal based on the configuration and the type of frequency hopping, and transmit a set of repetitions of the reference signal over the determined reference signal resource according to the type of time division cover coding.

In some examples of the method, apparatuses, and non-transitory computer-readable medium described herein, transmitting the set of repetitions of the reference signal may include operations, features, means, or instructions for transmitting the set of repetitions of the reference signal over each of a set of subsets of the determined reference signal resource using one of a set of antennas.

In some examples of the method, apparatuses, and non-transitory computer-readable medium described herein, the type of frequency hopping may include operations, features, means, or instructions for transmitting the set of repetitions of the reference signal over a first frequency resource within a first set of symbols of a slot.

In some examples of the method, apparatuses, and non-transitory computer-readable medium described herein, the type of frequency hopping may include operations, features, means, or instructions for transmitting a first subset of the set of repetitions of the reference signal over a first frequency resource within a first set of symbols of a slot, and transmitting a second subset of the set of repetitions of the reference signal over a second frequency resource within a second set of symbols of the slot.

In some examples of the method, apparatuses, and non-transitory computer-readable medium described herein, the type of frequency hopping may include operations, features, means, or instructions for transmitting a first subset of the set of repetitions of the reference signal over a first frequency resource within a first set of symbols of a first slot, and transmitting a second subset of the set of repetitions of the reference signal over a second frequency resource within a second set of symbols of a second slot.

In some examples of the method, apparatuses, and non-transitory computer-readable medium described herein, transmitting the set of repetitions of the reference signal may include operations, features, means, or instructions for applying a first value of a cover code to a first repetition of the reference signal, the first repetition of the reference signal transmitted in a first symbol and applying a second value of the cover code to a second repetition of the reference signal, the second repetition of the reference signal transmitted in a second symbol.

In some examples of the method, apparatuses, and non-transitory computer-readable medium described herein, the first symbol and the second symbol may be in a same slot.

In some examples of the method, apparatuses, and non-transitory computer-readable medium described herein, the first symbol and the second symbol may be not contiguous symbols of the same slot.

In some examples of the method, apparatuses, and non-transitory computer-readable medium described herein, the first symbol may be in a first slot and the second symbol may be in a second slot.

In some examples of the method, apparatuses, and non-transitory computer-readable medium described herein, the configuration for the reference signal resource set includes an indicator of a quantity of symbols of a guard period for the antenna switching.

In some examples of the method, apparatuses, and non-transitory computer-readable medium described herein, the configuration for the reference signal resource set includes an indication of a time interlacing for the type of frequency hopping.

In some examples of the method, apparatuses, and non-transitory computer-readable medium described herein, the reference signal may be a sounding reference signal.

In some examples of the method, apparatuses, and non-transitory computer-readable medium described herein, the configuration for the reference signal resource set may be periodic, aperiodic, or semi-persistent.

A method of wireless communications is described. The method may include transmitting, to a UE, a configuration for a reference signal resource set for transmitting a reference signal for antenna switching, the configuration including an indication of a type of time division cover coding for repetitions of the reference signal and an indication of a type of frequency hopping and receiving a set of repetitions of the reference signal over a determined reference signal resource according to the type of time division cover coding and based on the indication of the type of frequency hopping.

An apparatus for wireless communications is described. The apparatus may include a processor, memory coupled with the processor, and instructions stored in the memory. The instructions may be executable by the processor to cause the apparatus to transmit, to a UE, a configuration for a reference signal resource set for transmitting a reference signal for antenna switching, the configuration including an indication of a type of time division cover coding for repetitions of the reference signal and an indication of a type of frequency hopping and receive a set of repetitions of the reference signal over a determined reference signal resource according to the type of time division cover coding and based on the indication of the type of frequency hopping.

Another apparatus for wireless communications is described. The apparatus may include means for transmitting, to a UE, a configuration for a reference signal resource set for transmitting a reference signal for antenna switching, the configuration including an indication of a type of time division cover coding for repetitions of the reference signal and an indication of a type of frequency hopping and receiving a set of repetitions of the reference signal over a determined reference signal resource according to the type of time division cover coding and based on the indication of the type of frequency hopping.

A non-transitory computer-readable medium storing code for wireless communications is described. The code may include instructions executable by a processor to transmit, to a UE, a configuration for a reference signal resource set for transmitting a reference signal for antenna switching, the configuration including an indication of a type of time division cover coding for repetitions of the reference signal and an indication of a type of frequency hopping and receive a set of repetitions of the reference signal over a determined reference signal resource according to the type of time division cover coding and based on the indication of the type of frequency hopping.

In some examples of the method, apparatuses, and non-transitory computer-readable medium described herein, the type of frequency hopping may include operations, features, means, or instructions for receiving the set of repetitions of the reference signal over a first frequency resource within a first set of symbols of a slot.

In some examples of the method, apparatuses, and non-transitory computer-readable medium described herein, the type of frequency hopping may include operations, features, means, or instructions for receiving a first subset of the set of repetitions of the reference signal over a first frequency resource within a first set of symbols of a slot, and receiving a second subset of the set of repetitions of the reference signal over a second frequency resource within a second set of symbols of the slot.

In some examples of the method, apparatuses, and non-transitory computer-readable medium described herein, the type of frequency hopping may include operations, features, means, or instructions for receiving a first subset of the set of repetitions of the reference signal over a first frequency resource within a first set of symbols of a first slot, and receiving a second subset of the set of repetitions of the reference signal over a second frequency resource within a second set of symbols of a second slot.

In some examples of the method, apparatuses, and non-transitory computer-readable medium described herein, receiving the set of repetitions of the reference signal may include operations, features, means, or instructions for receiving the set of repetitions of the reference signal based on an application of a first value of a cover code to a first repetition of the reference signal, the first repetition of the reference signal transmitted in a first symbol and an application of a second value of the cover code to a second repetition of the reference signal, the second repetition of the reference signal transmitted in a second symbol.

In some examples of the method, apparatuses, and non-transitory computer-readable medium described herein, the first symbol and the second symbol may be in a same slot.

In some examples of the method, apparatuses, and non-transitory computer-readable medium described herein, the first symbol and the second symbol may be not contiguous symbols of the same slot.

In some examples of the method, apparatuses, and non-transitory computer-readable medium described herein, the first symbol may be in a first slot and the second symbol may be in a second slot.

In some examples of the method, apparatuses, and non-transitory computer-readable medium described herein, the configuration for the reference signal resource set includes an indicator of a quantity of symbols of a guard period for the antenna switching.

Some examples of the method, apparatuses, and non-transitory computer-readable medium described herein may further include operations, features, means, or instructions for transmitting, to a second UE, a configuration for an uplink transmission by the second UE within the guard period for the antenna switching for the first UE.

In some examples of the method, apparatuses, and non-transitory computer-readable medium described herein, the configuration for the reference signal resource set includes an indication of a time interlacing for the frequency hopping.

In some examples of the method, apparatuses, and non-transitory computer-readable medium described herein, the reference signal may be a sounding reference signal.

In some examples of the method, apparatuses, and non-transitory computer-readable medium described herein, the configuration for the reference signal resource set may be periodic, aperiodic, or semi-persistent.

DETAILED DESCRIPTION

A user equipment (UE) in a wireless communications system may communicate with other wireless devices, such as a base station. The base station may configure resources for communications by the UE. In some cases, the UE may have multiple antennas, and may transmit reference signals according to an antenna switching process to provide channel estimation for each antenna. The UE may then select antennas for uplink transmissions or the base station may determine downlink transmission beams based on the channel estimation.

A UE may transmit a reference signal, such as a sounding reference signal (SRS) to a base station. In some cases, reference signal resources may be configured by the base station or network for a particular set of symbols, and a particular number of ports or antennas. For example, in some cases, the reference signal resources may be configured to span 1, 2, or 4 consecutive or non-consecutive symbols, with up to 4 ports per reference signal resource. Each port of a reference signal resource may be sounded in each symbol. A reference signal resource set configured by the base station may contain one or more reference signal resources for use by a UE. The UE may be configured by the base station with multiple resources, which may be grouped in a reference signal resource set depending on the use case. The use cases may include antenna switching, codebook-based communications, non-codebook-based communications, or beam management.

The reference signal resource configuration transmitted to the UE from the base station may include an indication of different reference signal resources sets, a guard period configuration (e.g., a number of guard symbols to use between each reference signal resource set), an indication of a type of frequency hopping, an indication of a type of cover coding. For example, the indication of the type of frequency hopping may include an indication of no frequency hopping, inter-slot frequency hopping, or intra slot frequency hopping, as well as a number of symbols to frequency hop over and other parameters. The indication of the type of cover coding may include an indication of whether to perform cover coding, intra or inter-slot application for cover coding, and on which symbols to apply cover coding.

The UE may then transmit reference signals in the configured resources based on the indication of the type of frequency hopping and the indication of the type of cover coding.

Aspects of the disclosure are initially described in the context of wireless communications systems. Aspects of the disclosure are then described in the context of slot diagrams and process flows. Aspects of the disclosure are further illustrated by and described with reference to apparatus diagrams, system diagrams, and flowcharts that relate to repetition and time domain cover code based sounding reference signal resources for antenna switching.

Figure 1:
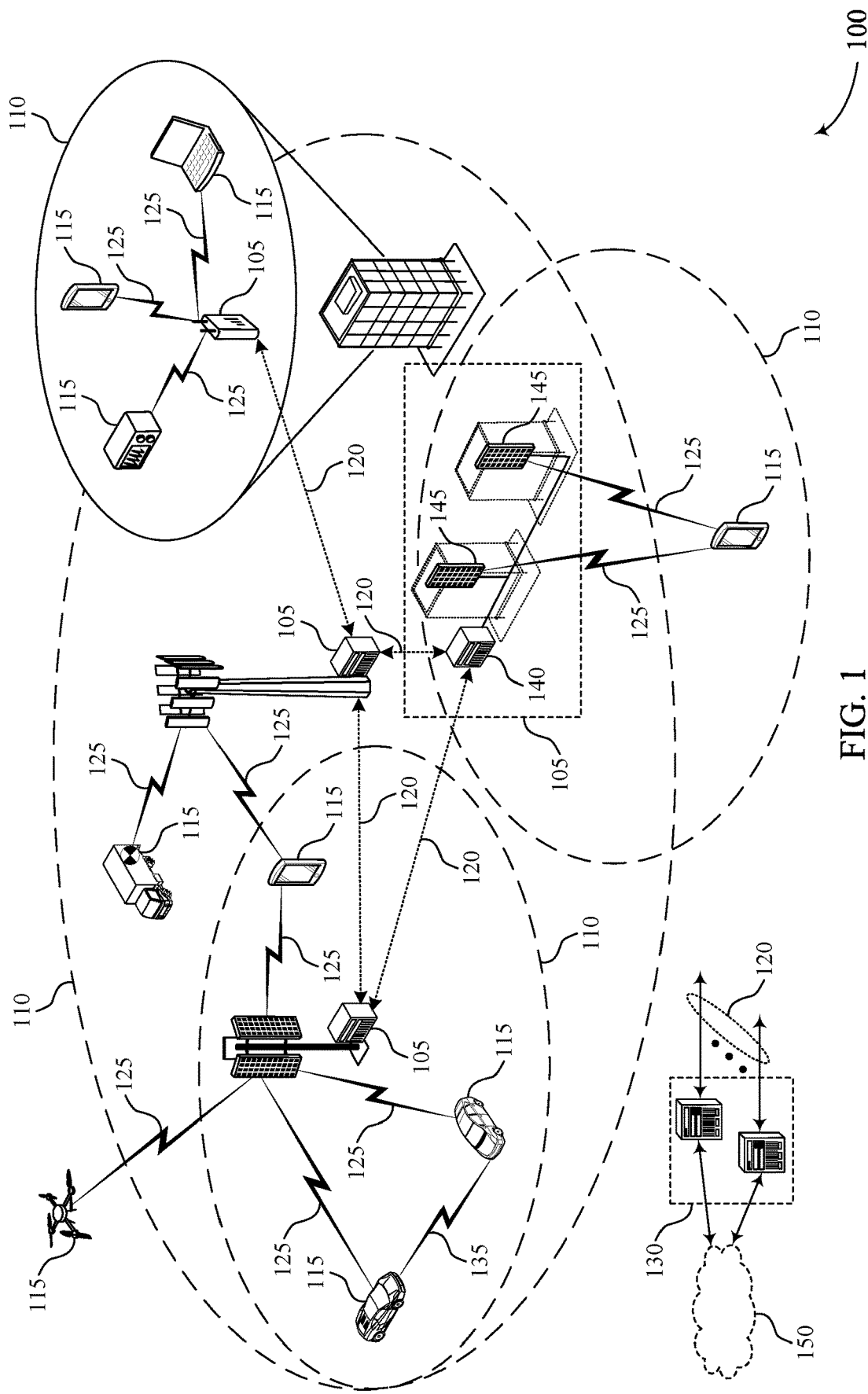
FIG. 1 illustrates an example of a system for wireless communications that supports repetition and time domain cover code based sounding reference signal resources for antenna switching in accordance with aspects of the present disclosure.

FIG. 1 illustrates an example of a wireless communications system 100 that supports repetition and time domain cover code based sounding reference signal resources for antenna switching in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHZ, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may use cover coding for SRS resources for performing antenna switching. The UE 115 may receive, from a base station 105, a configuration for a reference signal resource set for transmitting a reference signal for antenna switching. The configuration information from the base station 105 may include an indication of a type of time division cover coding for the UE 115 to use for repetitions of the reference signal and an indication of a type of frequency hopping. The UE 115 may determine a reference signal resource for transmission of the reference signal based on the configuration and the type of frequency hopping receives in the configuration from the base station 105. The UE 115 may then transmit a set of repetitions of the reference signal over the determined reference signal resource according to the type of time division cover coding, as part on an antenna switching process.

Figure 2:
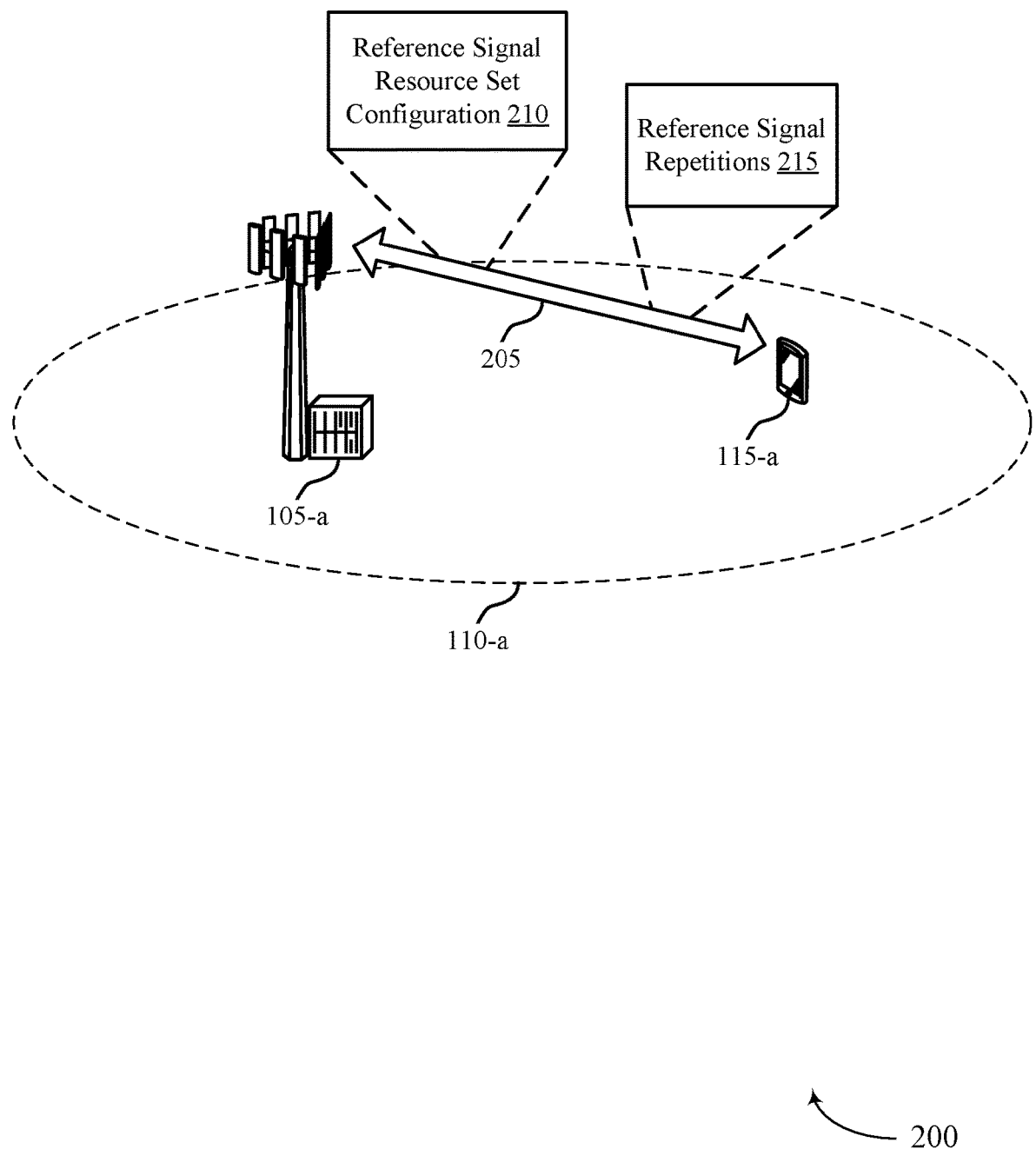
FIG. 2 illustrates an example of a wireless communications system that supports repetition and time domain cover code based sounding reference signal resources for antenna switching in accordance with aspects of the present disclosure.

FIG. 2 illustrates an example of a wireless communications system 200 that supports repetition and time domain cover code based sounding reference signal resources for antenna switching in accordance with aspects of the present disclosure. In some examples, wireless communications system 200 may implement aspects of wireless communication system 100. Wireless communications system 200 may include UE 115-a, which may be an example of a UE 115 as described with respect for FIG. 1. Wireless communications system 200 may also include base station 105-a, which may be an example of a base station 105 as described with respect to FIG. 1. Base station 105-a may serve UE 115-a and other UEs 115 in coverage area 110-a. Base station 105-a and UE 115-a may communicate over communication link 205. Base station 105-a may schedule communications for UE 115-a.

In some cases, UE 115-a may be configured to use (e.g., may be physically present at the UE 115-a or enabled) a number of transmit antennas as well as a number of receive antennas. UE 115-a may use up to the number of transmit antennas to transmit signals and may use up to the number of receive antennas to receive signals. In some cases, the number of transmit antennas versus the number of receive antennas may be given by xTyR, where x may be equal to the number of transmit antennas and y may be equal to the number of receive antennas. For instance, 1T4R may correspond to UE 115-a having 4 physical antennas, and being configured to concurrently use 1 transmit antenna and up to 4 receive antennas.

Performing SRS antenna switching may involve UE 115-a transmitting SRS to base station 105-a over the transmit antennas and base station 105-a exploiting channel reciprocity to perform downlink beamforming for a time division duplexed (TDD) channel. For instance, base station 105-a may receive the SRS, may perform uplink channel estimation, and may exploit channel reciprocity to determine a downlink channel estimation from the uplink channel estimation. Base station 105-a may use the downlink channel estimation for downlink beamforming. SRS resource sets whose resources are used for antenna switching may be said to have an antenna switching usage type. Generally, SRS antenna switching may be supported if $x<y$ for xTyR (e.g., 1T2R, 2T4R, 1T4R, 1T4R/2T4R). The number of SRS resources in an SRS resource set for antenna switching may be given by X/y. For example an antenna switching SRS resource set for a UE configured with 1T4R may have four SRS resources.

Base station 105-a may transmit, to UE 115-a over communication link 205, a reference signal resource set configuration 210. Configuration 210 may include information for UE 115-a to use to transmit one or more reference signals in reference signal repetitions 215 to base station 105-a. The reference signal resource set configuration 210 may be transmitted to UE 115-a by base station 105-a, and may indicate whether reference signal transmissions by UE 115-a are aperiodic, semi-persistent (e.g., configured with repeating resources that are enabled and disabled via a signal such as in DCI), or periodic (e.g., repeating resources configured via RRC). In some cases, the reference signal resource set configuration 210 may be signaled in RRC signaling or downlink control information (DCI)), or a combination thereof.

The configuration 210 may include configuration information for UE 115-a to transmit a reference signal for antenna switching, including configuration information for a type of cover coding and frequency hopping for UE 115-a to use in the transmission of reference signal repetitions 215. The cover coding may apply, for example, a time-domain orthogonal cover code (TD-OCC). For example, a TD-OCC of length two may take the values $\{+1, +1\}$ or $\{+1, -1\}$, and additional lengths of the TD-OCC may take a similar or different structure.

For example, configuration 210 may include an indication of no frequency hopping, intra-slot frequency hopping, or inter-slot frequency hopping. Additionally or alternatively, configuration 210 may include an indication of no TD-OCC, intra-slot TD-OCC, or inter-slot TD-OCC. Based on the reference signal resource set configuration 210, UE 115-a may transmit reference signal repetitions 215 for performing antenna switching. For example, UE 115-a may transmit reference signal repetitions 215 based on one or more of slot diagrams 301, 302, 401, 402, 501, 502, 601, and 602, or a combination of these, as described herein. UE 115-a may transmit reference signals according to the configured resources based on the different frequency hopping configurations, TD-OCC configurations, configured guard periods, and other parameters.

Thus, the efficiency of the channel resource utilization may be improved, as base station 105-a may configure reference signals resource sets and configurations to different UEs 115, such that each UE 115 may perform antenna switching over non-interfering frequency, time, and code resources.

Figure 3:
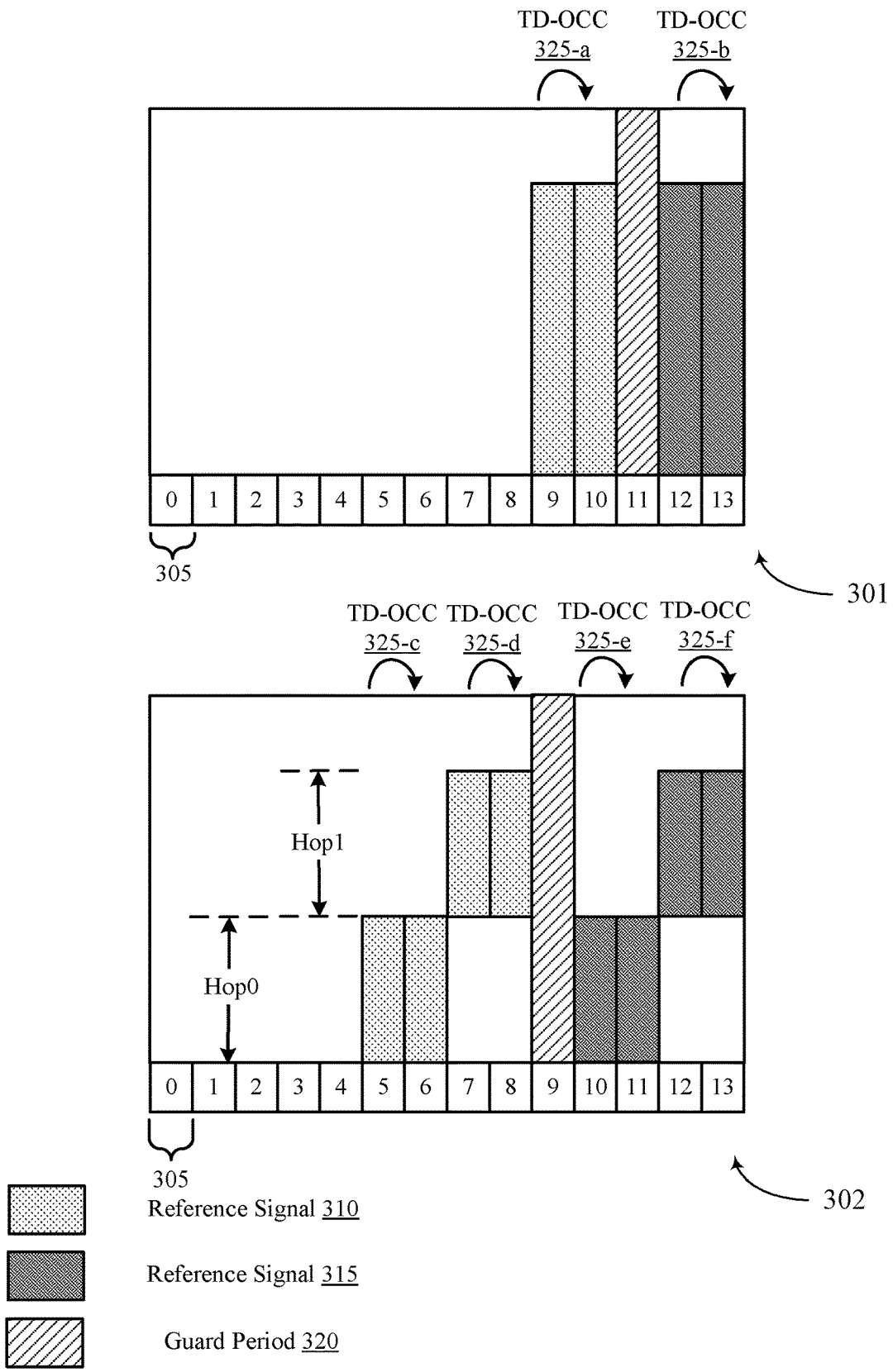
FIG. 3-6 illustrate examples of slot diagrams that supports repetition and time domain cover code based sounding reference signal resources for antenna switching in accordance with aspects of the present disclosure.

FIG. 3 illustrates examples of slot diagrams 301 and 302 that support repetition and time domain cover code based sounding reference signal resources for antenna switching in accordance with aspects of the present disclosure. In some examples, slot diagrams 301 and 302 may implement aspects of wireless communication systems 100 and 200. A UE 115 may transmit reference signals according to the time, frequency, and coding as described in slot diagrams 301 and 302.

Slot diagrams 301 and 302 may illustrate examples of reference signal transmissions for antenna switching with TD-OCC application. Slot diagram 301 may illustrate and example of reference signal transmissions without frequency hopping, and slot diagram 302 may illustrate an example of reference signal transmissions with frequency hopping. A UE 115 may transmit the reference signals described herein using intra-slot repetition. A UE 115 may transmit SRS as a part of an antenna switching process. Performing SRS antenna switching may involve the UE 115 transmitting SRS to base station 105-a over the transmit antennas. For example, the UE 115 may transmit SRS based on the number of available antennas. Generally, SRS antenna switching may be supported if $x<y$ for xTyR (e.g., 1T2R, 2T4R, 1T4R, 1T4R/2T4R). The number of SRS resources in an SRS resource set for antenna switching may be given by X/y. For example an antenna switching SRS resource set for a UE configured with 1T4R may have four SRS resources.

The example shown may be for a UE having 1T2R or 2T4R, configured to transmit two repetitions of each SRS. In the case of slot diagram 301, SRS resources for transmission of reference signal 310 using a first antenna or subset of antennas may be repeated across a number of consecutive symbols (e.g., symbols 9 and 10) of a slot. A next set of SRS resources for transmission of reference signal 315 using a second antenna or subset of antennas may also be consecutive (e.g., symbols 12 and 13) and may be separated from the first set of reference signal resources for reference signal 310 by a guard period 320 (e.g., in symbol 11), in which the UE switches between transmit antennas or groups of transmit antennas.

Slot diagram 301 illustrates reference signal repetition transmissions with TD-OCC 325-a application on a per symbol 305 basis. The TD-OCC 325-a may be applied such that a first reference signal 310 may be transmitted in symbol 9 across a frequency band with the first value of a TD-OCC 325-a. The UE 115 may transmit a repetition of reference signal 310 in symbol 10 with the second value of TD-OCC 325-a.

Reference signal 315 may be configured for transmission using TD-OCC 325-b. A UE 115 may transmit reference signal 315 in symbol 12 with the first value of TD-OCC 325-b. The UE 115 may transmit a repetition of reference signal 315 in symbol 13 with the second value of TD-OCC 325-b.

Slot diagram 302 illustrates reference signal repetition transmissions with TD-OCC 325 application on a per symbol 305 basis with frequency hopping.

In the case of slot diagram 302, SRS resources for transmission of reference signal 310 may be repeated across a number of consecutive symbols (e.g., symbols 9 and 10) with a number of frequency hops. There may be N number of consecutive symbols in the reference signal resource for reference signal 310, and there may be M number of frequency hops. In this case, each frequency hop may be over N/M number of symbols. For example, the reference signal resource for reference signal 310 may include four consecutive symbols (e.g., symbols 5, 6, 7, and 8) and two frequency hops (e.g., frequency hops Hop0 and Hop1). Thus, each frequency hop is over two symbols. For each frequency hop, a TD-OCC 325 may be applied to the two symbols within the slot. For example, TD-OCC 325-c may be applied to reference signal 310 repetitions in symbols 5 and 6 for frequency Hop0, and TD-OCC 325-d may be applied to reference signal 310 repetitions in symbols 7 and 8 for frequency Hop1. The sequence for reference signal 310 transmitted in frequency Hop0 may be the same as the sequence for reference signal 310 transmitted in frequency Hop1, or the sequences for frequency Hop0 and frequency Hop1 may be different portions of a sequence for reference signal 310 (e.g., determined according to resource blocks or subcarriers).

The TD-OCC 325-c may be applied such that a first reference signal 310 may be transmitted by a UE 115 in symbol 5 across Hop0 with the first value of TD-OCC 325-c. The UE 115 may transmit a repetition of reference signal 310 in symbol 6 in frequency Hop0 with the second value of TD-OCC 325-c. Then, in frequency Hop1, UE 115 may transmit reference signal 310 repetitions with TD-OCC 325-d. The UE 115 may transmit reference signal 310 in symbol 7 with the first value of TD-OCC 325-d, and may transmit reference signal 310 repetition in symbol 8 with the second value of TD-OCC 325-c.

A next set of SRS resources for transmission of reference signals 315 with frequency hopping may also be consecutive (e.g., symbols 10, 11, 12, and 13) and may be separated from the first set of reference signal resources for reference signal 310 by a guard period 320 (e.g., in symbol 9). The next set of reference signal resources for reference signal 315 may also include TD-OCC 325-d. A UE 115 may transmit reference signal 315 in symbol 10 with the first value of TD-OCC 325-e. The UE 115 may transmit a repetition of reference signal 315 in symbol 11 with a second value of TD-OCC 325-e.

Then, in frequency Hop1, UE 115 may transmit reference signal 315 repetitions with TD-OCC 325-f. The UE 115 may transmit reference signal 310 in symbol 12 with the first value of TD-OCC 325-d, and may transmit reference signal 310 repetition in symbol 13 with the second value of TD-OCC 325-d.

Figure 4:
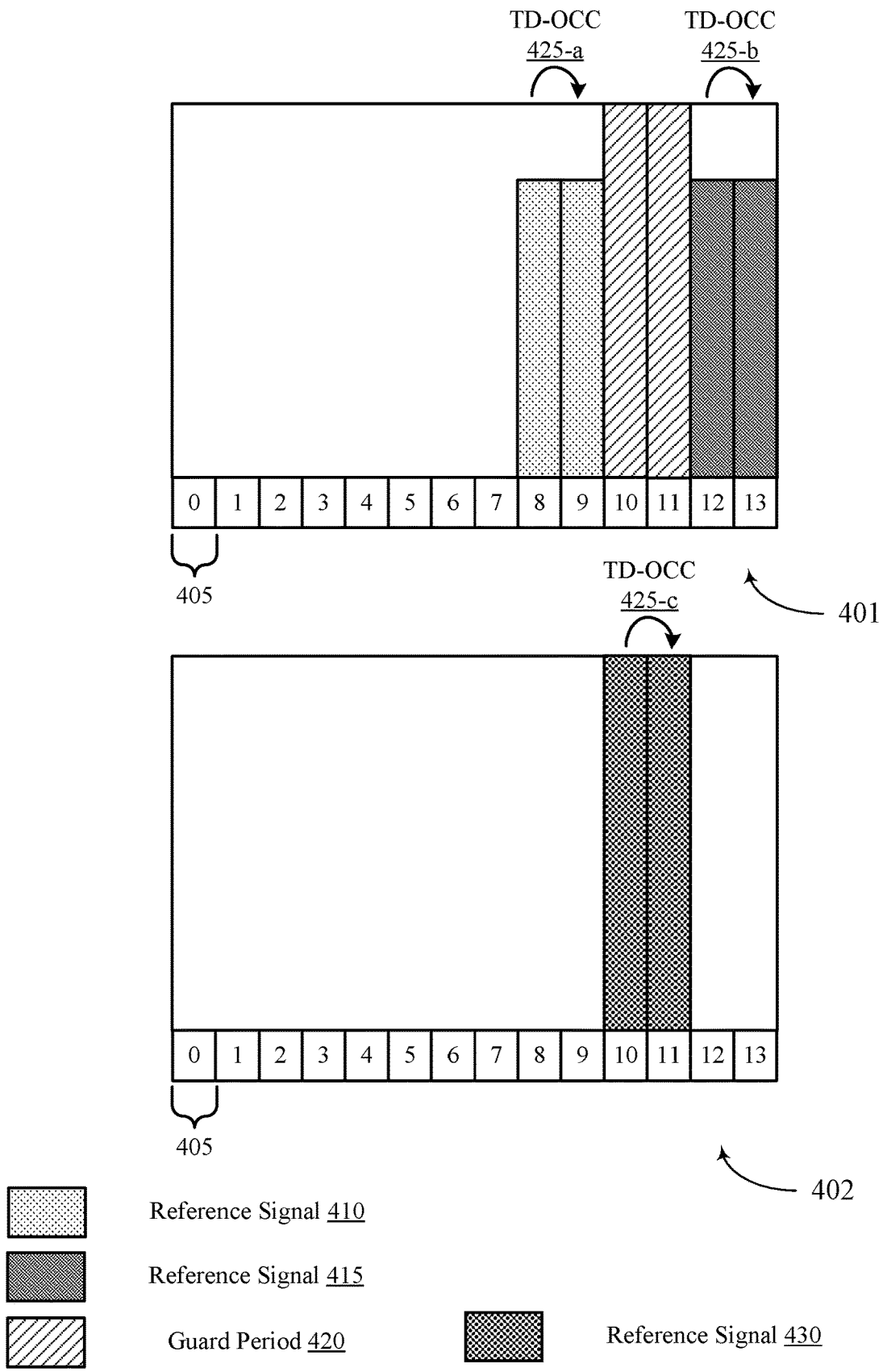

FIG. 4 illustrates an example of slot diagrams 401 and 402 that support repetition and time domain cover code based sounding reference signal resources for antenna switching in accordance with aspects of the present disclosure. In some examples, slot diagrams 401 and 402 may implement aspects of wireless communication systems 100 and 200. A UE 115 may transmit reference signals according to the time, frequency, and coding as described in slot diagrams 401 and 402.

Slot diagrams 401 and 402 may illustrate examples of reference signal transmissions for antenna switching with TD-OCC application. Slot diagram 401 may illustrate and example of reference signal transmissions without frequency hopping.

A guard period 420 of a number of symbols 405 may be configurable by the network. The guard period 420 configuration may be indicated by a base station 105 in a configuration message to a UE 115. The network may configure the guard period to be one or more symbols, depending on the frequency band in use. For example, the guard period 420 may be one or more symbols 405 for sub-carrier spacings of 15 kHz, 30 kHz, and 60 kHz, and the guard period 420 may be 2 or more symbols 405 for 120 kHz sub-carrier spacings. The UE may receive an indicator of a number of symbols of guard period 420, or a configuration of resources for reference signal 410 and reference signal 415 may convey (e.g., implicitly) the number of symbols of the guard period 420. This may allow the network to utilize the guard symbols configured for a first UE 115 for another UE 115 to perform uplink transmissions, such as reference signal transmission or uplink data channel transmission.

For example, a first UE 115 may be configured with reference signal resource configuration 401, and may transmit reference signal 410 with repetitions across a first set of resources (e.g., symbols 8 and 9) with TD-OCC 425-a as described with reference to FIG. 3. The first UE 115 may then be configured with a guard period 420 of two symbols, 10 and 11. The first UE 115 may then transmit reference signal 415 with repetitions across a second set of resources (e.g., symbols 12 and 13) with TD-OCC 425-b as described with reference to FIG. 3.

A second UE 115 may be configured with reference signal resources according to slot diagram 402 in the same slot as slot diagram 401. The second UE 115 may use a third set of reference signal resources for transmission of reference signal 430 with repetitions during the guard period between the first and second sets of resources (e.g., symbols 10 and 11). In some cases, the reference signal 430 may be transmitted using a TD-OCC (e.g., with TD-OCC 425-c). The transmission of reference signal 430 by the second UE according to slot diagram 402 may thus overlap with the guard period of slot diagram 401, and the corresponding resource usage by the first UE. Although illustrated transmitted reference signal 430, the second UE 115 may be configured for a different uplink transmission (e.g., PUSCH transmission) during the guard period 420 for the first UE.

The network may thus improve throughput and efficiency by increasing the guard period for reference signal resource sets, and by coordination guard periods 420 and reference signal transmissions between different UEs 115.

Figure 5:
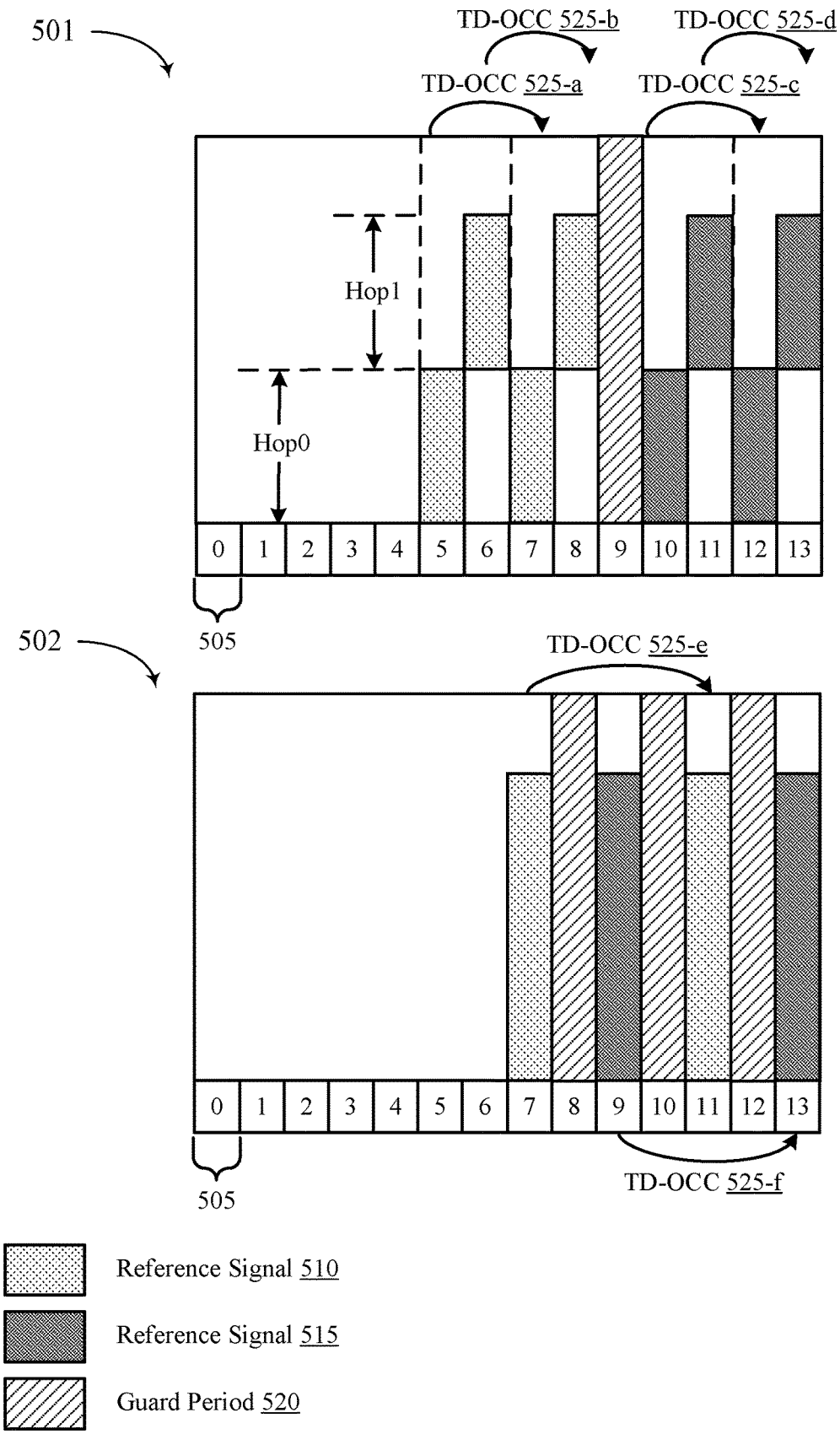

FIG. 5 illustrates an example of slot diagrams 501 and 502 that support repetition and time domain cover code based sounding reference signal resources for antenna switching in accordance with aspects of the present disclosure. In some examples, slot diagrams 501 and 502 may implement aspects of wireless communication systems 100 and 200. A UE 115 may transmit reference signals according to the time, frequency, and coding as described in slot diagrams 501 and 502.

The TD-OCC for reference signal repetitions may also be applied across non-consecutive or interlaced reference signal transmissions, with or without frequency hopping. Slot diagrams 501 and 502 may illustrate examples of reference signal transmissions for antenna switching with non-consecutive TD-OCC application. Slot diagram 501 may illustrate an example of reference signal transmissions with frequency hopping, and slot diagram 502 may illustrate an example of reference signal transmissions without frequency hopping.

In the case of slot diagram 501, SRS resources for transmission of reference signal 510 may include one or more repetitions and frequency hops across a number of consecutive symbols (e.g., symbols 5, 6, 7, and 8). A next set of SRS resources for transmission of reference signal 515 may also be consecutive (e.g., symbols 10, 11, 12, and 13) and may be separated from the first set of reference signal resources for reference signal 510 by a guard period 520 (e.g., symbol 9). However, the application of TD-OCC may not be across consecutive symbols.

Slot diagram 501 illustrates reference signal repetition transmissions with TD-OCC 525 application on a per symbol 505 basis. The TD-OCC 525-*a* may be applied such that a first reference signal 310 may be transmitted in symbol 5 in first frequency hop0, and with the first value of TD-OCC 525-*a*. The UE 115 may transmit a repetition of reference signal 510 in symbol 7 in frequency Hop0 with the second value of TD-OCC 525-*a*. The UE 115 may also transmit, in frequency Hop1, a repetition of reference signal 510 in symbol 6 with the first value of TD-OCC 525-*b*. The UE 115 may then also transmit a repetition of reference signal 510 in symbol 8 in frequency Hop1 with the second value of TD-OCC 525-*b*. Thus, each full TD-ODD 525 is applied across non-consecutive symbols, but to portions of reference signal 510 transmitted in the same frequency hop. In some cases, TDD-OCC 525-*a* may be the same as TD-OCC 525-*b*, and may be associated with transmission of reference signal 510 (e.g., transmission of SRS using a first antenna or subset of antennas).

Similarly, for the next set of reference signal resources for reference signal 515, TD-OCC 525-*c* may be applied to reference signal repetitions in Hop0 in symbols 10 and 12, and TD-OCC 525-*d* may be applied to reference signal repetitions in frequency Hop1 in symbols 11 and 13. The reference signal resource set for reference signals 510 may be separated from the reference signal resource set for reference signals 515 by guard period 520. In some cases, TD-OCC 525-*c* may be the same as TD-OCC 525-*d*, and may be associated with transmission of reference signal 515 (e.g., transmission of SRS using a second antenna or subset of antennas). In some cases, TD-OCC 525-*c* and TD-OCC 525-*d* may be the same as TD-OCC 525-*a* and TD-OCC 525-*b*, and may be a TD-OCC 525 allocated for the UE for reference signal transmissions.

Slot diagram 502 illustrates reference signal repetition transmissions with TD-OCC 525 application on a per symbol 505 basis with interlaced reference signal resources and without frequency hopping. The TD-OCC 525-*e* may be applied such that a first reference signal 510 may be transmitted in symbol 7, and with the first value of TD-OCC 525-*e*. The UE 115 may transmit a repetition of reference signal 510 in symbol 11 with the second value of TD-OCC 525-*e*. The UE 115 may also transmit a repetition of reference signal 515 in symbol 9 with the first value of TD-OCC 525-*f*. The UE 115 may then also transmit a repetition of reference signal 515 in symbol 13 with the second value of TD-OCC 525-*e*. Thus, each full TD-OCC 525 is applied across non-consecutive symbols.

Similarly, for the next set of reference signal resources for reference signal 515, TD-OCC 525-*c* may be applied to reference signal repetitions in Hop0 in symbols 10 and 12, and TD-OCC 525-*d* may be applied to reference signal repetitions in frequency Hop1 in symbols 11 and 13.

Figure 6:
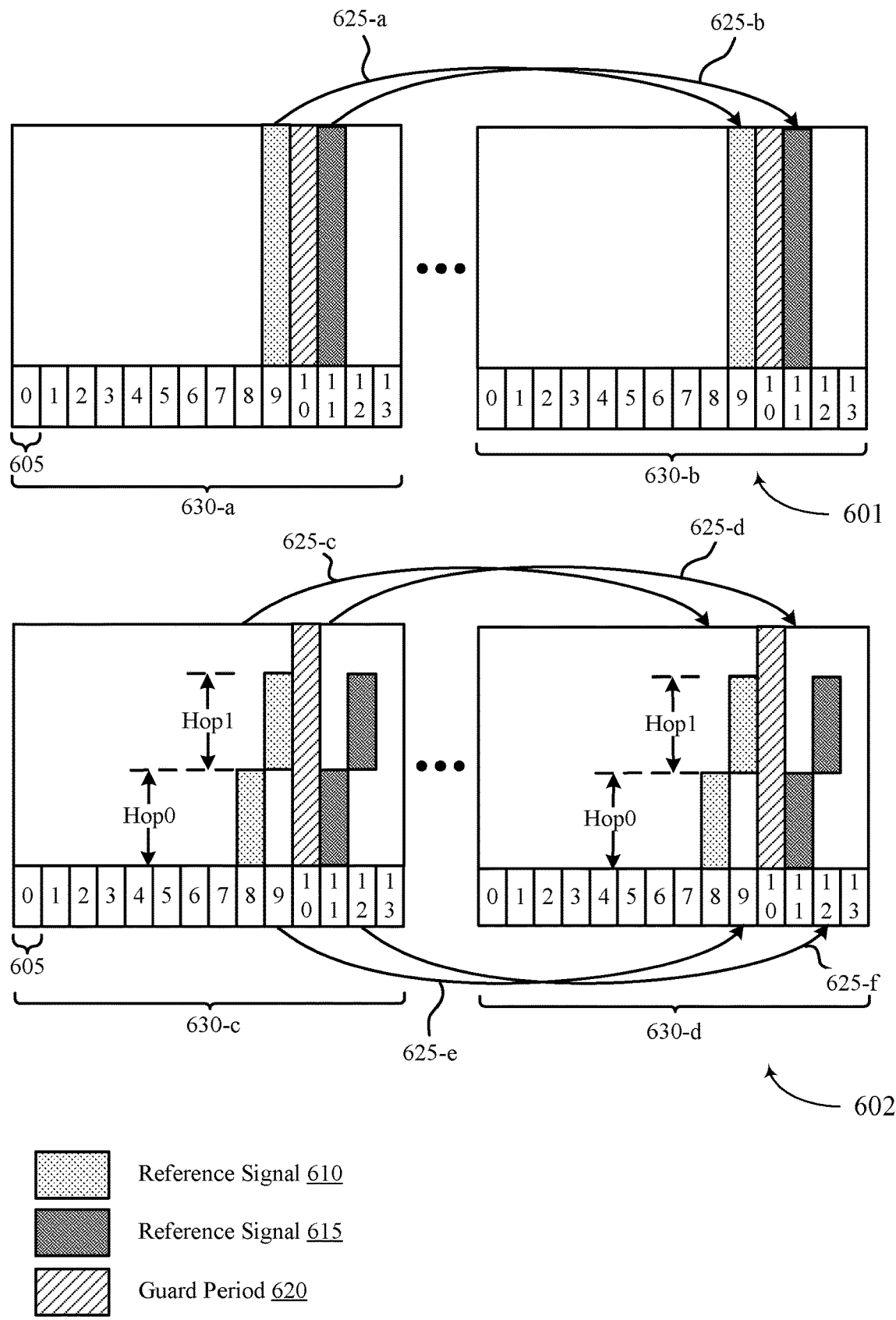

FIG. 6 illustrates an example of slot diagrams 601 and 602 that support repetition and time domain cover code based sounding reference signal resources for antenna switching in accordance with aspects of the present disclosure. In some examples, slot diagrams 601 and 602 may implement aspects of wireless communication systems 100 and 200. A UE 115 may transmit reference signals according to the time, frequency, and coding as described in slot diagrams 601 and 602. Slot diagrams 601 and 602 may illustrate reference signal transmission configurations with the application of inter-slot TD-OCC, with and without frequency hopping. The reference signal resources for reference signals 610 and 615 may be repeated across two or more slots 630 with the application of a TD-OCC. Reference signal 610 and 615 may be transmitted in symbols 605.

In slot diagram 601, the reference signal resource may be configured without frequency hopping. The reference signal resources for reference signal 610 may be across two slots, 630-*a* and 630-*b*. The reference signal resource set of reference signal 615 may also be configured across slots 630-*a* and 630-*b*. In slot 630-*a* (e.g., slot n), reference signal 610 may be transmitted in symbol 9. Reference signal 610 may be repeated in a subsequent slot 630-*b* (e.g., slot n+k, where k is greater than or equal to 1), where reference signal 610 is also in symbol 9. TD-OCC 625-*a* may be applied to reference signal 610 across slots 630-*a* and 630-*b*. Reference signal 615 may be transmitted in symbol 11 in the first slot 630-*a*, and also in symbol 11 in slot 630-*b*. TD-OCC 625-*b* may also be applied across slots 630-*a* and 630-*b* in this case. In this example, the guard period may be in symbol 10 in both slots 630-*a* and 630-*b*. A TD-OCC may be applied in additional slots or for additional repetitions. For example, a length 4 TD-OCC may be applied for four repetitions of a reference signal across four slots. Where two repetitions are transmitted in each slot, a length 4 TD-OCC may be applied across two slots (e.g., two values of the TD-OCC applied in each of two slots). In some cases, TD-OCC 625-*a* may be the same as TD-OCC 625-*b*, and may be associated with transmission of reference signals by a UE 115.

In slot diagram 602, the reference signal resource may be configured to include frequency hopping with the inter-slot TD-OCC. The reference signal resource set for reference signals 610 in slot 630-*c* (e.g., slot n) may be configured in two symbols, 8 and 9. The reference signal 610 may also be in symbols 8 and 9 with frequency hopping in slot 630-*d* (e.g., slot n+k). Reference signal 610 transmitted in in frequency Hop0, for example, may have TD-OCC 625-*c* applied across slots 630-*c* and 630-*d*. Similarly, reference signal 610 transmitted in frequency Hop1 may also have TD-OCC 625-*d* applied across slots 630-*c* and 630-*d*. Reference signal 615 may be transmitted in symbols 11 and 12 in frequency hops Hop0 and Hop1, respectively, with TD-OCCs 625-*e* and 625-*f* applied across slots 630-*c* and 630-*d*. The guard period 620 in this case may be shown in symbol 10 for both slots 630-*c* and 630-*d*. In some cases, TD-OCC 625-*c* may be the same as TD-OCC 625-*d*, and may be associated with transmission of reference signal 610 (e.g., transmission of SRS using a first antenna or subset of antennas). In some cases, TD-OCC 625-*e* may be the same as TD-OCC 625-*f*, and may be associated with transmission of reference signal 615 (e.g., transmission of SRS using a second antenna or subset of antennas). In some cases, TD-OCC 625-*c* and TD-OCC 625-*d* may be the same as TD-OCC 625-*a* and TD-OCC 625-*b*, and may be a TD-OCC 625 allocated for the UE for reference signal transmissions.

Figure 7:
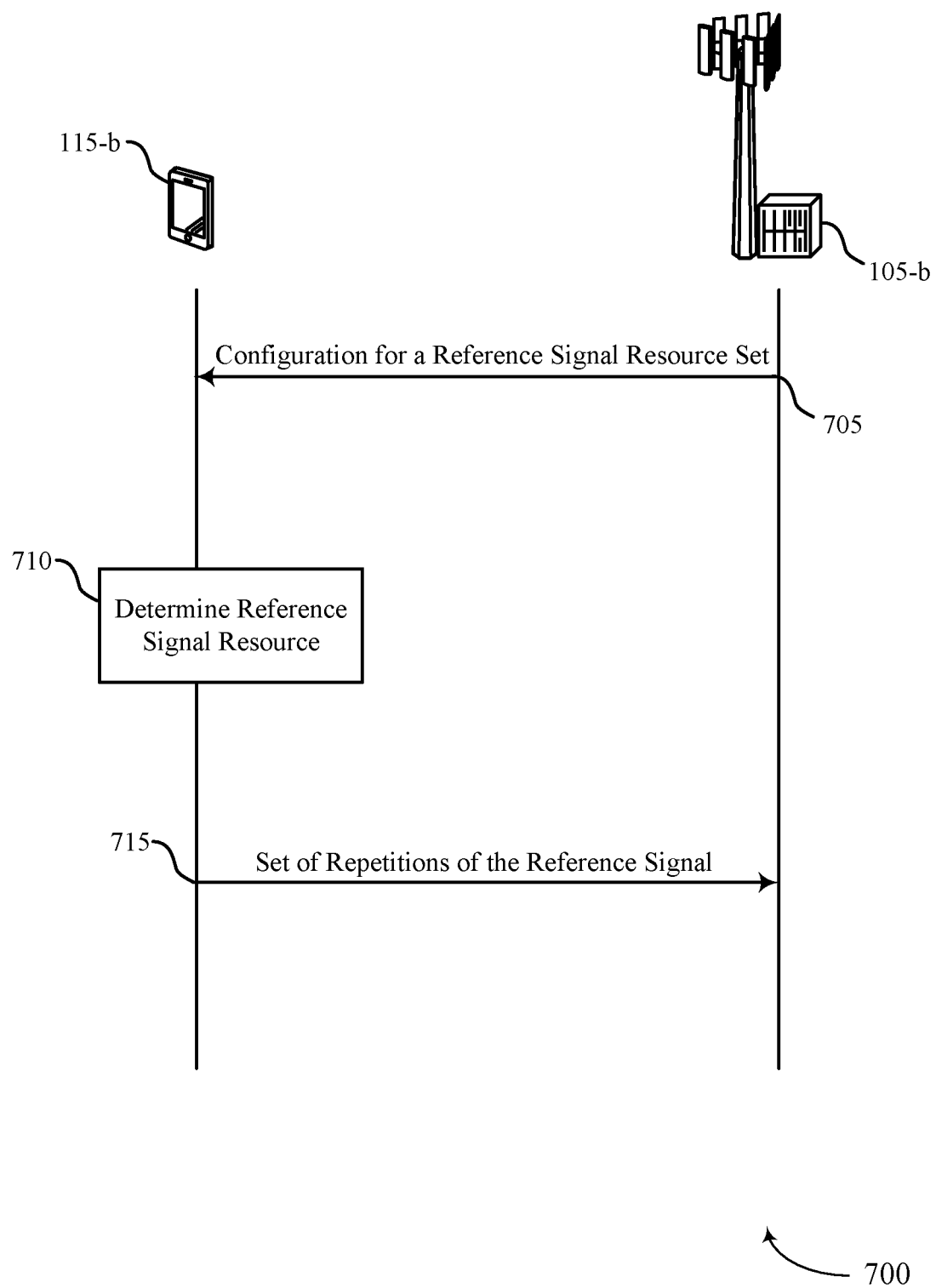
FIG. 7 illustrates an example of a process flow that supports repetition and time domain cover code based sounding reference signal resources for antenna switching in accordance with aspects of the present disclosure.

FIG. 7 illustrates an example of a process flow 700 that supports repetition and time domain cover code based sounding reference signal resources for antenna switching in accordance with aspects of the present disclosure. In some examples, process flow 700 may implement aspects of wireless communication systems 100 and 200. Process flow 700 may include UE 115-*b* and base station 105-*b*, which may be examples of UEs 115 and base station 105 as described with reference to FIGS. 1 and 2. UE 115-*b* may be served by base station 105-*b* as part of a wireless communications system as described herein.

At 705, UE 115-*b* may receive, from base station 105-*b*, a configuration for a reference signal resource set for transmitting a reference signal for antenna switching, the configuration including an indication of a type of time division cover coding (e.g., TD-OCC) for repetitions of the reference signal and an indication of a type of frequency hopping. The reference signal may be an example of an SRS or another type of reference signal for antenna switching. The configuration for the reference signal resource set may include an indicator of a quantity of symbols of a guard period for the antenna switching. The configuration may also include an indication of a time interlacing for the type of frequency hopping.

At 710, UE 115-*b* may determine a reference signal resource for transmission of the reference signal based on the configuration and the type of frequency hopping.

At 715, UE 115-*b* may transmit, to base station 105-*b*, a set of repetitions of the reference signal over the determined reference signal resource according to the type of time division cover coding. The UE 115-*b* may transmit the set of repetitions of the reference signal over each of a set of subsets of the determined reference signal resource using one of a set of antennas.

In some cases, the type of frequency hopping may be no frequency hopping. In these cases, UE 115-*b* may transmit the set of repetitions of the reference signal over a first frequency resource within a first set of symbols of a slot.

In some cases, the type of frequency hopping may include intra-slot frequency hopping. In these cases, UE 115-*b* may transmit a first subset of the set of repetitions of the reference signal over a first frequency resource. The UE 115-*b* may also transmit a second subset of the set of repetitions of the reference signal over a frequency resource within a second set of symbols of the slot.

In some cases, the type of frequency hopping may include inter-slot frequency hopping. In these cases, UE 115-*b* may transmit a first subset of the set of repetitions of the reference signal over a first frequency resource within a first set of symbols of a first slot. UE 115-*b* may also transmit a second subset of the set of repetitions of the reference signal over a second frequency resource within a second set of symbols of the second slot.

In any of these cases, UE 115-*b* may apply a first value of a cover code to a first repetition of the reference signal transmitted in a first symbol, and apply a second value of the cover code to a second repetition of the reference signal, the second repetition of the reference signal transmitted in a second symbol. In some cases, the first symbol and the second symbol are in the same slot. In some cases, the first symbol and the second symbol are not contiguous symbols of the same slot. In some cases, the first symbol is in a first slot and the second symbol is in a second slot.

Figure 8:
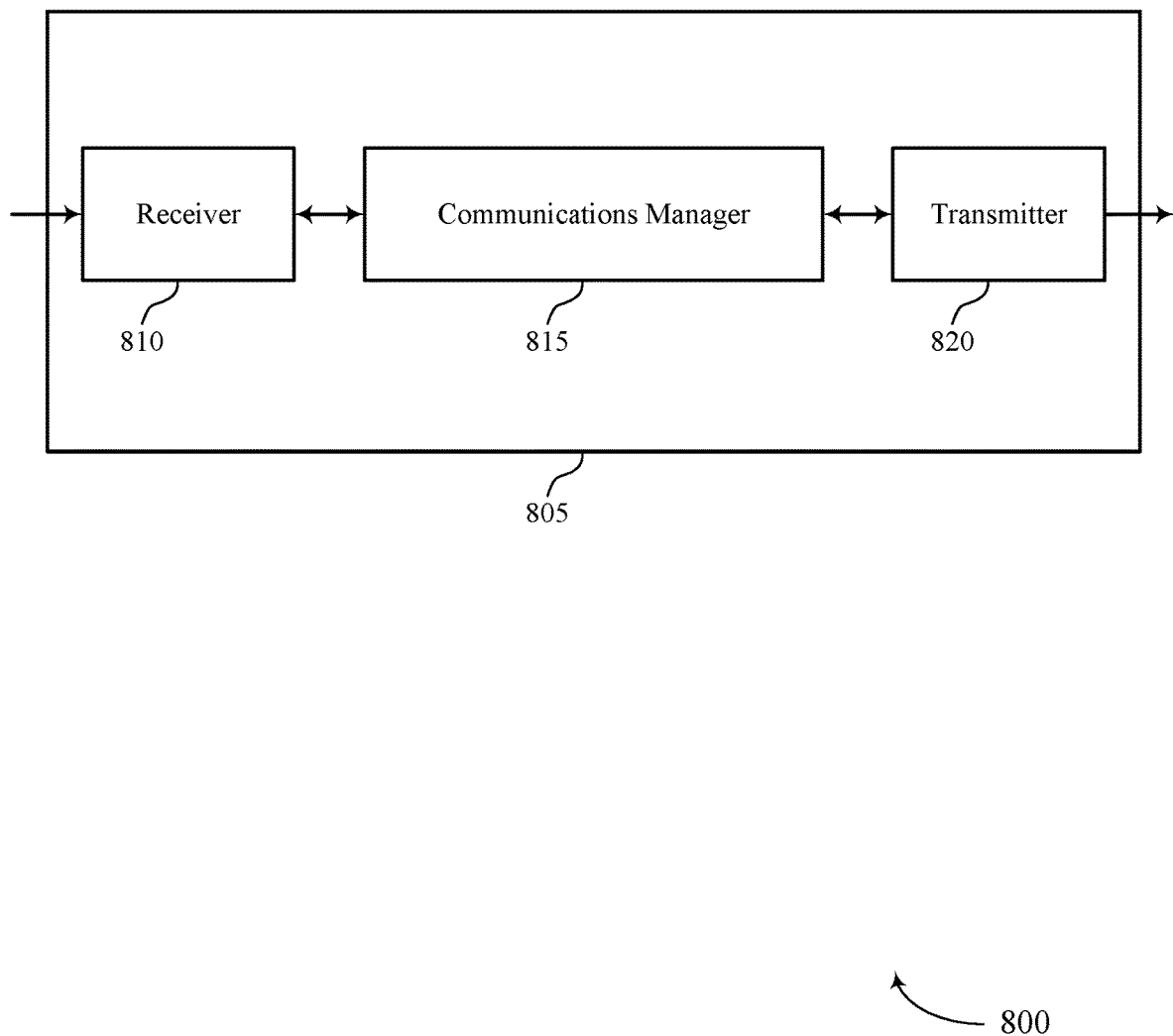
FIGS. 8 and 9 show block diagrams of devices that support repetition and time domain cover code based sounding reference signal resources for antenna switching in accordance with aspects of the present disclosure.

FIG. 8 shows a block diagram 800 of a device 805 that supports repetition and time domain cover code based sounding reference signal resources for antenna switching in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to repetition and time domain cover code based sounding reference signal resources for antenna switching, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive a configuration for a reference signal resource set for transmitting a reference signal for antenna switching, the configuration including an indication of a type of time division cover coding for repetitions of the reference signal and an indication of a type of frequency hopping, determine a reference signal resource for transmission of the reference signal based on the configuration and the type of frequency hopping, and transmit a set of repetitions of the reference signal over the determined reference signal resource according to the type of time division cover coding. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

In some examples, the communications manager 815 described herein may be implemented as a chipset of a wireless modem, and the receiver 810 and the transmitter 820 may be implemented as sets of analog components (e.g., amplifiers, filters, phase shifters, antennas, etc.) The wireless modem may obtain and decode signals from the receiver 810 over a receive interface, and may output signals for transmission to the transmitter 820 over a transmit interface.

The actions performed by the communications manager 815 as described herein may be implemented to realize one or more potential advantages. one implementation may allow a UE 115 to save power and increase battery life by improving efficiency in reference signal transmissions, particularly involved with antennas switching. Another implementation may allow the UE 115 to improve reliability by aligning transmissions so to decrease interference with other UEs 115 in a wireless communications system.

Figure 9:
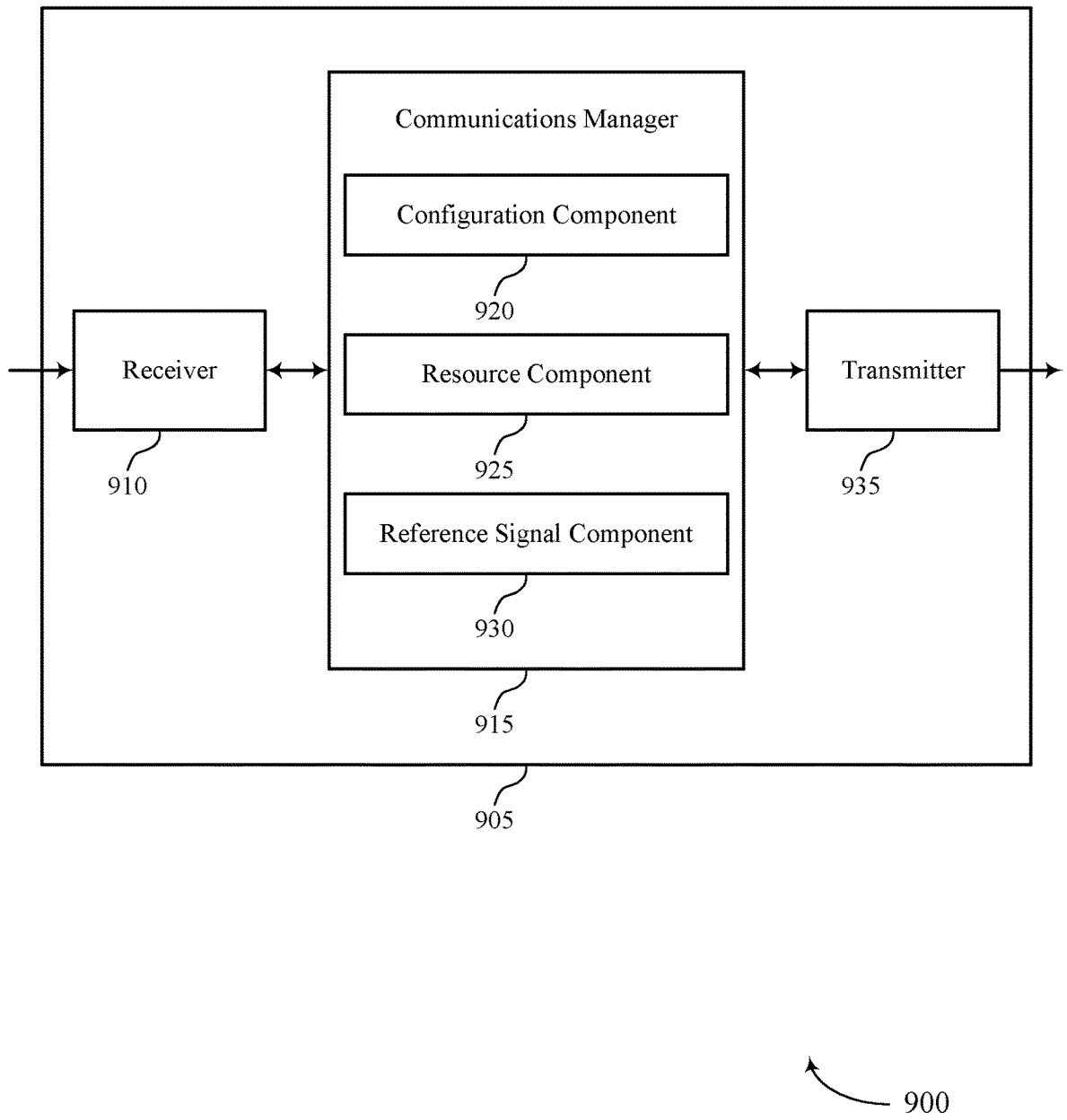

FIG. 9 shows a block diagram 900 of a device 905 that supports repetition and time domain cover code based sounding reference signal resources for antenna switching in accordance with aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to repetition and time domain cover code based sounding reference signal resources for antenna switching, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a configuration component 920, a resource component 925, and a reference signal component 930. The communications manager 915 may be an example of aspects of the communications manager 1110 described herein.

The configuration component 920 may receive a configuration for a reference signal resource set for transmitting a reference signal for antenna switching, the configuration including an indication of a type of time division cover coding for repetitions of the reference signal and an indication of a type of frequency hopping.

The resource component 925 may determine a reference signal resource for transmission of the reference signal based on the configuration and the type of frequency hopping.

The reference signal component 930 may transmit a set of repetitions of the reference signal over the determined reference signal resource according to the type of time division cover coding.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

A processor of a UE 115 (e.g., controlling the receiver 910, the transmitter 935, or the transceiver 1120 as described with reference to FIG. 9), may efficiently operate one or more components of the UE 115 to improve efficiency of the UE.115. For example, the processor may operate the receiver 910 to receive configuration information from a base station 105, which may be used by the processor of the UE 115 to efficiently operate reference signal antenna switching. This configuration information may further allow the UE 115 to improve reliability by enabling the network to perform channel estimation, and also decrease interference.

Figure 10:
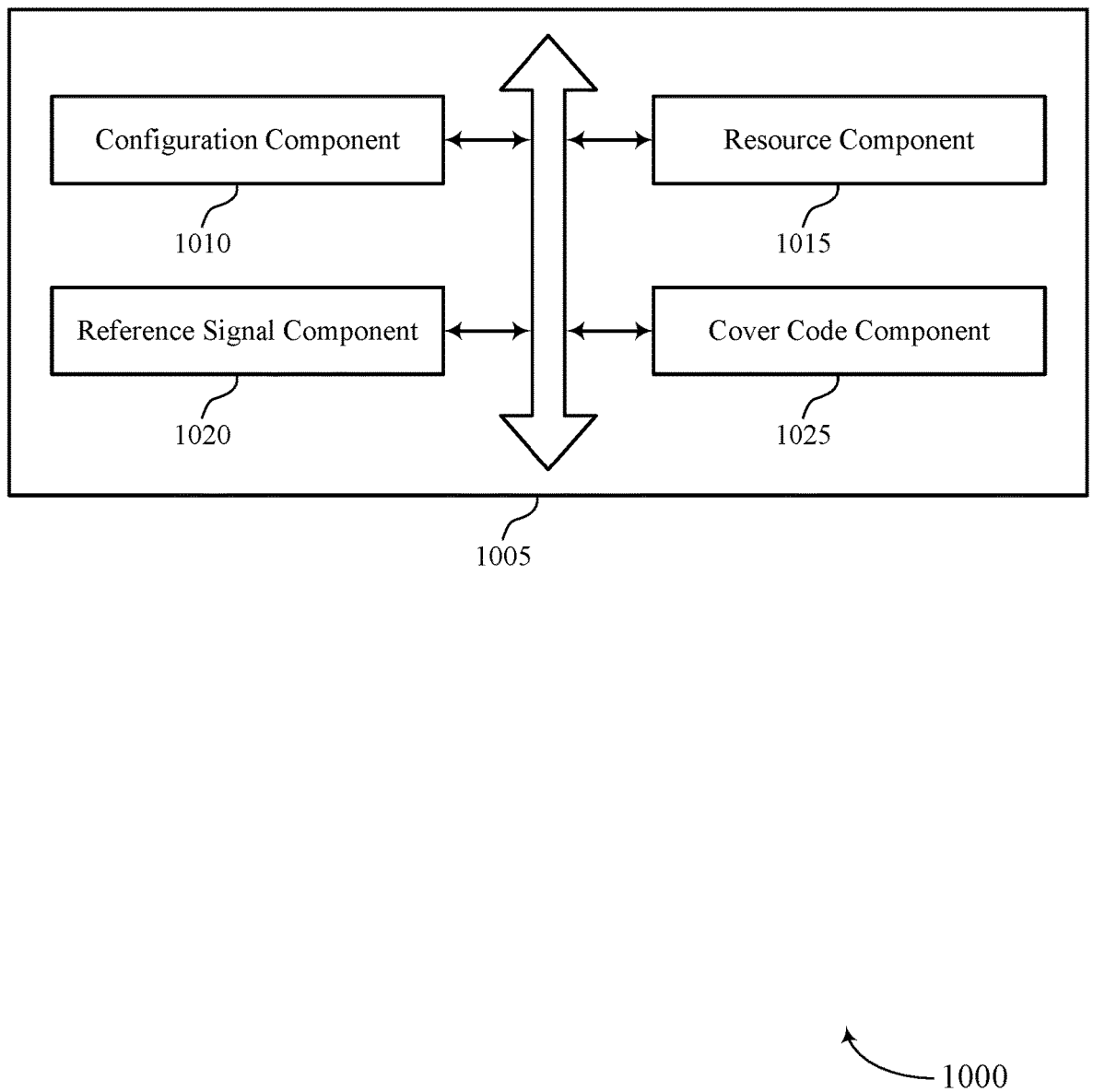
FIG. 10 shows a block diagram of a communications manager that supports repetition and time domain cover code based sounding reference signal resources for antenna switching in accordance with aspects of the present disclosure.

FIG. 10 shows a block diagram 1000 of a communications manager 1005 that supports repetition and time domain cover code based sounding reference signal resources for antenna switching in accordance with aspects of the present disclosure. The communications manager 1005 may be an example of aspects of a communications manager 815, a communications manager 915, or a communications manager 1110 described herein. The communications manager 1005 may include a configuration component 1010, a resource component 1015, a reference signal component 1020, and a cover code component 1025. Each of these modules may communicate, directly or indirectly, with one another (e.g., via one or more buses).

The configuration component 1010 may receive a configuration for a reference signal resource set for transmitting a reference signal for antenna switching, the configuration including an indication of a type of time division cover coding for repetitions of the reference signal and an indication of a type of frequency hopping.

In some cases, the configuration for the reference signal resource set includes an indicator of a quantity of symbols of a guard period for the antenna switching.

In some cases, the configuration for the reference signal resource set includes an indication of a time interlacing for the type of frequency hopping.

In some cases, the reference signal is a sounding reference signal.

In some cases, the configuration for the reference signal resource set is periodic, aperiodic, or semi-persistent.

The resource component 1015 may determine a reference signal resource for transmission of the reference signal based on the configuration and the type of frequency hopping.

The reference signal component 1020 may transmit a set of repetitions of the reference signal over the determined reference signal resource according to the type of time division cover coding.

In some examples, the reference signal component 1020 may transmit the set of repetitions of the reference signal over each of a set of subsets of the determined reference signal resource using one of a set of antennas.

In some examples, the reference signal component 1020 may transmit the set of repetitions of the reference signal over a first frequency resource within a first set of symbols of a slot.

In some examples, the reference signal component 1020 may transmit a first subset of the set of repetitions of the reference signal over a first frequency resource within a first set of symbols of a slot.

In some examples, the reference signal component 1020 may transmit a second subset of the set of repetitions of the reference signal over a second frequency resource within a second set of symbols of the slot.

In some examples, the reference signal component 1020 may transmit a first subset of the set of repetitions of the reference signal over a first frequency resource within a first set of symbols of a first slot.

In some examples, the reference signal component 1020 may transmit a second subset of the set of repetitions of the reference signal over a second frequency resource within a second set of symbols of a second slot.

The cover code component 1025 may apply a first value of a cover code to a first repetition of the reference signal, the first repetition of the reference signal transmitted in a first symbol and applying a second value of the cover code to a second repetition of the reference signal, the second repetition of the reference signal transmitted in a second symbol.

In some cases, the first symbol and the second symbol are in a same slot.

In some cases, the first symbol and the second symbol are not contiguous symbols of the same slot.

In some cases, the first symbol is in a first slot and the second symbol is in a second slot.

Figure 11:
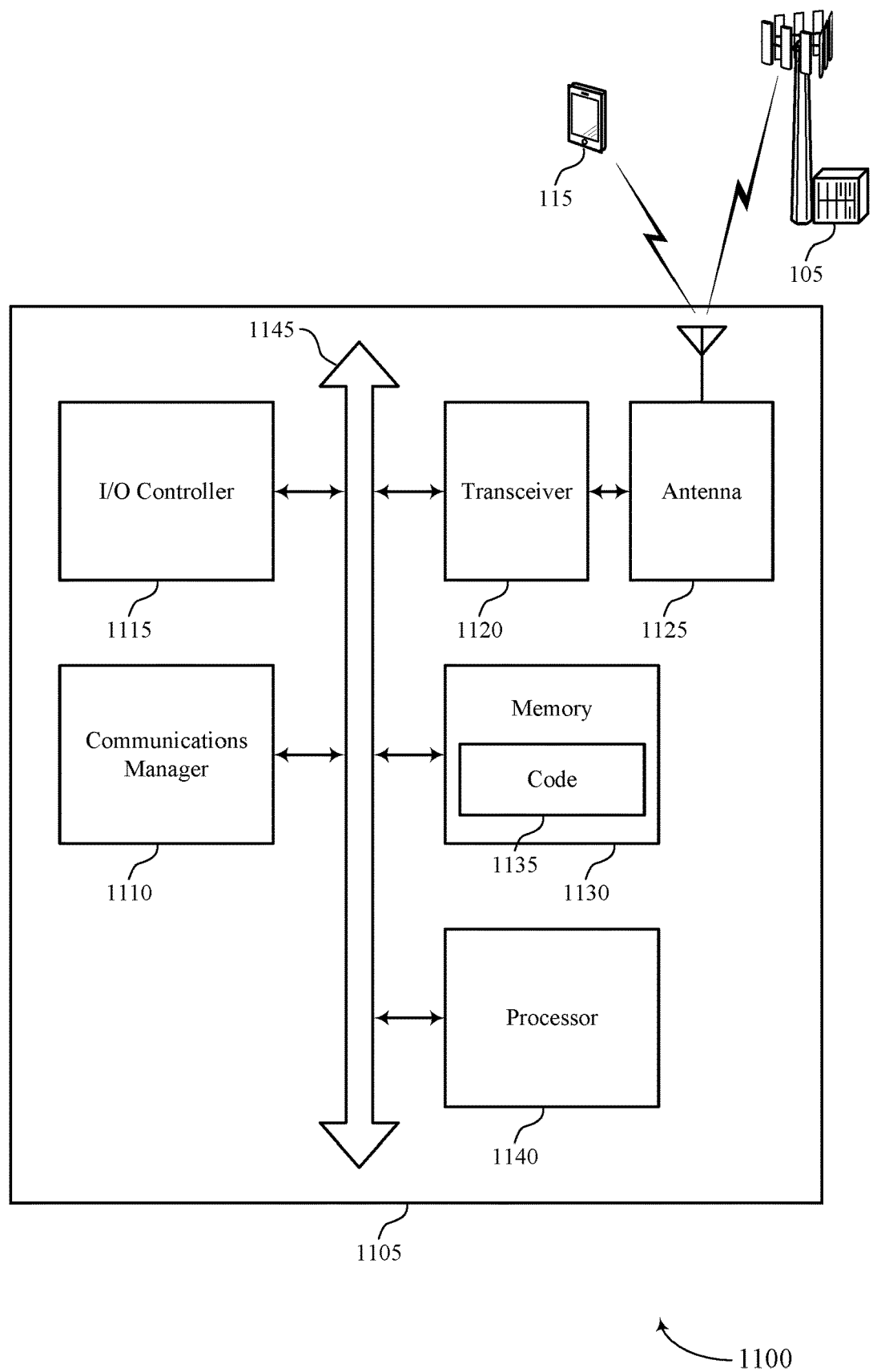
FIG. 11 shows a diagram of a system including a device that supports repetition and time domain cover code based sounding reference signal resources for antenna switching in accordance with aspects of the present disclosure.

FIG. 11 shows a diagram of a system 1100 including a device 1105 that supports repetition and time domain cover code based sounding reference signal resources for antenna switching in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive a configuration for a reference signal resource set for transmitting a reference signal for antenna switching, the configuration including an indication of a type of time division cover coding for repetitions of the reference signal and an indication of a type of frequency hopping, determine a reference signal resource for transmission of the reference signal based on the configuration and the type of frequency hopping, and transmit a set of repetitions of the reference signal over the determined reference signal resource according to the type of time division cover coding.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting repetition and time domain cover code based sounding reference signal resources for antenna switching).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
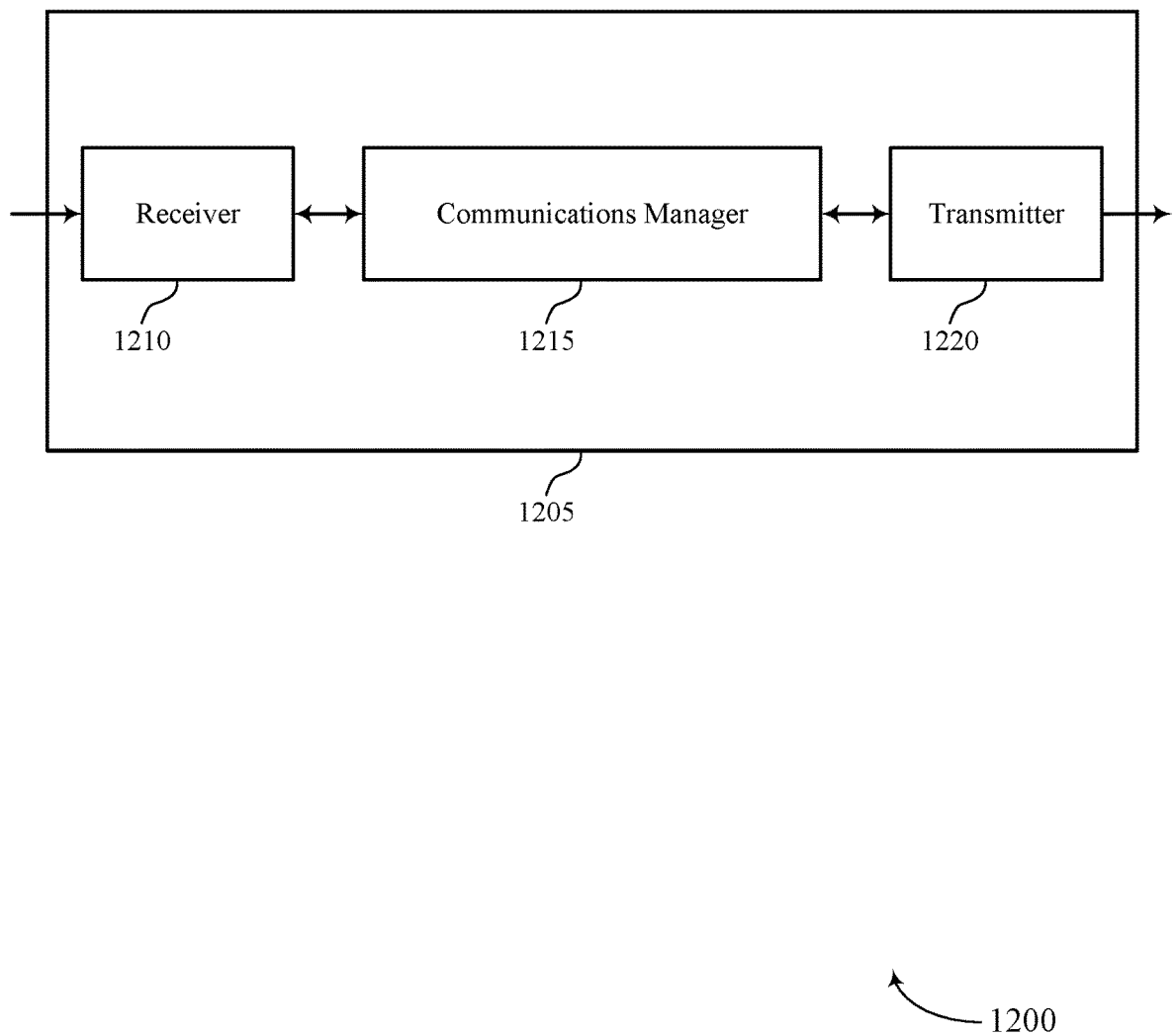
FIGS. 12 and 13 show block diagrams of devices that support repetition and time domain cover code based sounding reference signal resources for antenna switching in accordance with aspects of the present disclosure.

FIG. 12 shows a block diagram 1200 of a device 1205 that supports repetition and time domain cover code based sounding reference signal resources for antenna switching in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to repetition and time domain cover code based sounding reference signal resources for antenna switching, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may transmit, to a UE, a configuration for a reference signal resource set for transmitting a reference signal for antenna switching, the configuration including an indication of a type of time division cover coding for repetitions of the reference signal and an indication of a type of frequency hopping and receive a set of repetitions of the reference signal over a determined reference signal resource according to the type of time division cover coding and based on the indication of the type of frequency hopping. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
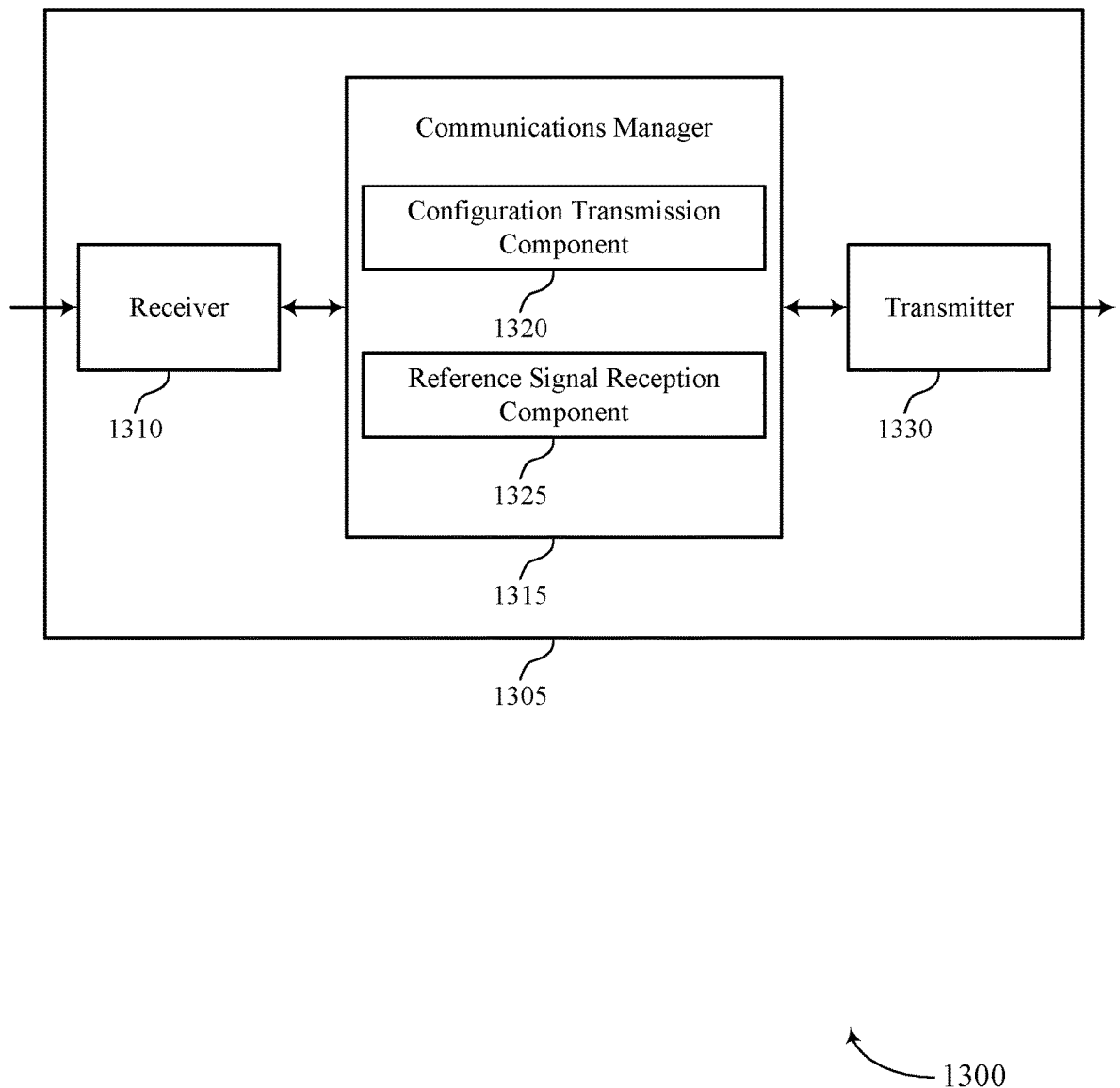

FIG. 13 shows a block diagram 1300 of a device 1305 that supports repetition and time domain cover code based sounding reference signal resources for antenna switching in accordance with aspects of the present disclosure. The device 1305 may be an example of aspects of a device 1205, or a base station 105 as described herein. The device 1305 may include a receiver 1310, a communications manager 1315, and a transmitter 1330. The device 1305 may also include a processor. Each of these components may be in communication with one another (e.g., via one or more buses).

The receiver 1310 may receive information such as packets, user data, or control information associated with various information channels (e.g., control channels, data channels, and information related to repetition and time domain cover code based sounding reference signal resources for antenna switching, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a configuration transmission component 1320 and a reference signal reception component 1325. The communications manager 1315 may be an example of aspects of the communications manager 1510 described herein.

The configuration transmission component 1320 may transmit, to a UE, a configuration for a reference signal resource set for transmitting a reference signal for antenna switching, the configuration including an indication of a type of time division cover coding for repetitions of the reference signal and an indication of a type of frequency hopping.

The reference signal reception component 1325 may receive a set of repetitions of the reference signal over a determined reference signal resource according to the type of time division cover coding and based on the indication of the type of frequency hopping.

The transmitter 1330 may transmit signals generated by other components of the device 1305. In some examples, the transmitter 1330 may be collocated with a receiver 1310 in a transceiver module. For example, the transmitter 1330 may be an example of aspects of the transceiver 1520 described with reference to FIG. 15. The transmitter 1330 may utilize a single antenna or a set of antennas.

Figure 14:
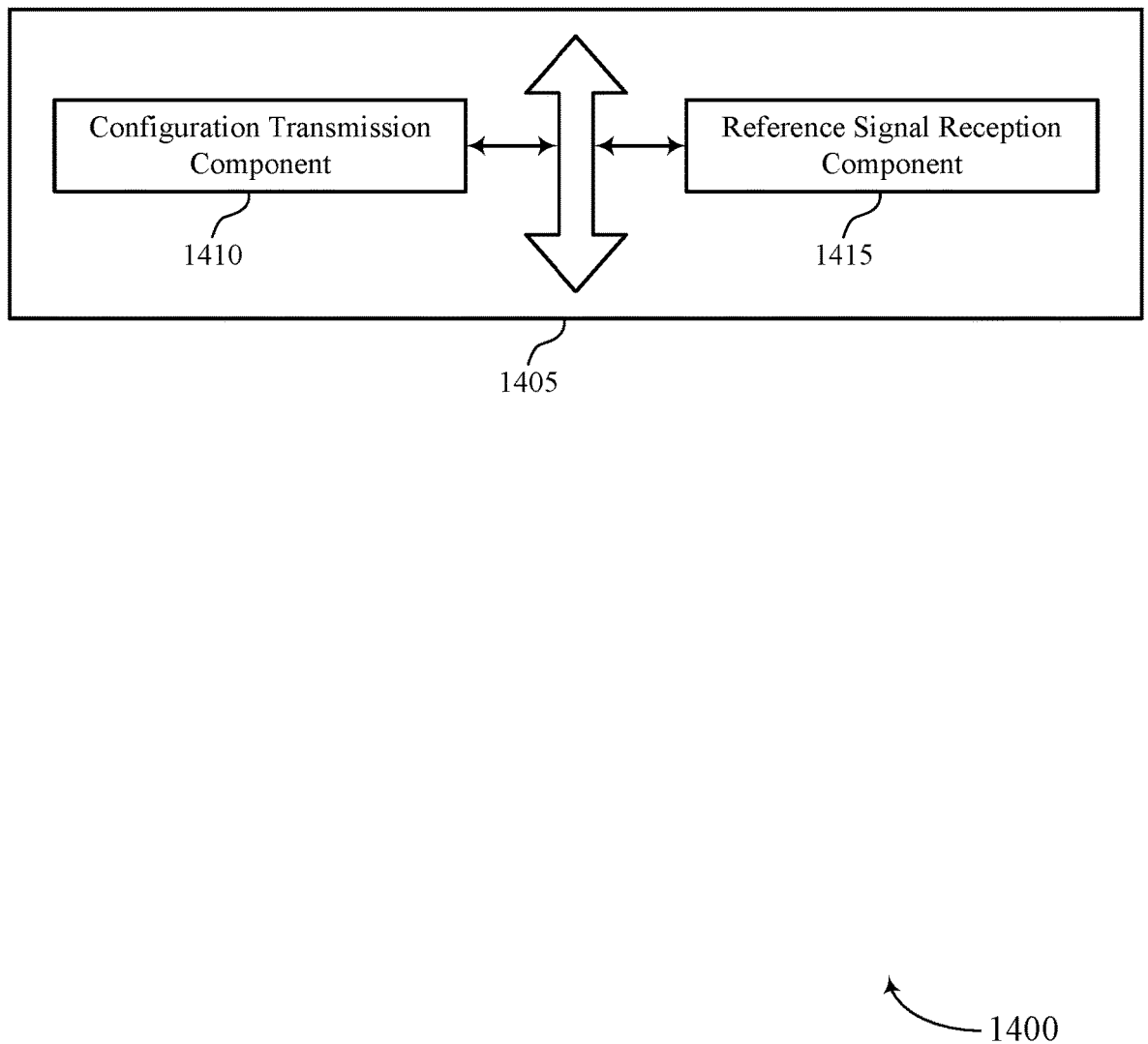
FIG. 14 shows a block diagram of a communications manager that supports repetition and time domain cover code based sounding reference signal resources for antenna switching in accordance with aspects of the present disclosure.

FIG. 14 shows a block diagram 1400 of a communications manager 1405 that supports repetition and time domain cover code based sounding reference signal resources for antenna switching in accordance with aspects of the present disclosure. The communications manager 1405 may be an example of aspects of a communications manager 1215, a communications manager 1315, or a communications manager 1510 described herein. The communications manager 1405 may include a configuration transmission component 1410 and a reference signal reception component 1415. Each of these modules may communicate, directly or indirectly, with one another (e.g., via one or more buses).

The configuration transmission component 1410 may transmit, to a UE, a configuration for a reference signal resource set for transmitting a reference signal for antenna switching, the configuration including an indication of a type of time division cover coding for repetitions of the reference signal and an indication of a type of frequency hopping.

In some examples, the configuration transmission component 1410 may transmit, to a second UE, a configuration for an uplink transmission by the second UE within the guard period for the antenna switching for the first UE.

In some cases, the configuration for the reference signal resource set includes an indicator of a quantity of symbols of a guard period for the antenna switching.

In some cases, the configuration for the reference signal resource set includes an indication of a time interlacing for the frequency hopping.

In some cases, the reference signal is a sounding reference signal.

In some cases, the configuration for the reference signal resource set is periodic, aperiodic, or semi-persistent.

The reference signal reception component 1415 may receive a set of repetitions of the reference signal over a determined reference signal resource according to the type of time division cover coding and based on the indication of the type of frequency hopping.

In some examples, the reference signal reception component 1415 may receive the set of repetitions of the reference signal over a first frequency resource within a first set of symbols of a slot.

In some examples, the reference signal reception component 1415 may receive a first subset of the set of repetitions of the reference signal over a first frequency resource within a first set of symbols of a slot.

In some examples, the reference signal reception component 1415 may receive a second subset of the set of repetitions of the reference signal over a second frequency resource within a second set of symbols of the slot.

In some examples, the reference signal reception component 1415 may receive a first subset of the set of repetitions of the reference signal over a first frequency resource within a first set of symbols of a first slot.

In some examples, the reference signal reception component 1415 may receive a second subset of the set of repetitions of the reference signal over a second frequency resource within a second set of symbols of a second slot.

In some examples, the reference signal reception component 1415 may receive the set of repetitions of the reference signal based on an application of a first value of a cover code to a first repetition of the reference signal, the first repetition of the reference signal transmitted in a first symbol and an application of a second value of the cover code to a second repetition of the reference signal, the second repetition of the reference signal transmitted in a second symbol.

In some cases, the first symbol and the second symbol are in a same slot.

In some cases, the first symbol and the second symbol are not contiguous symbols of the same slot.

In some cases, the first symbol is in a first slot and the second symbol is in a second slot.

Figure 15:
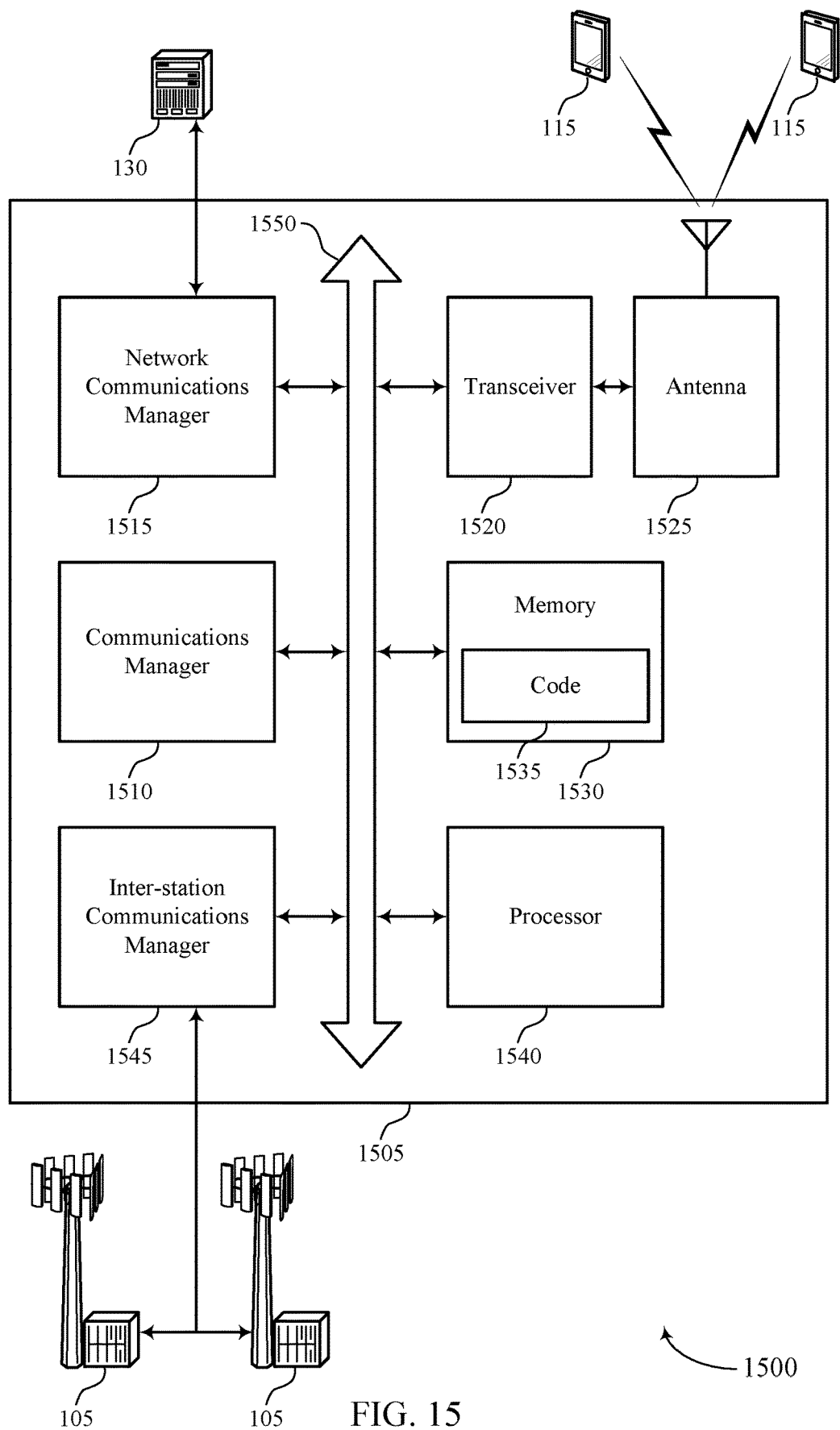
FIG. 15 shows a diagram of a system including a device that supports repetition and time domain cover code based sounding reference signal resources for antenna switching in accordance with aspects of the present disclosure.

FIG. 15 shows a diagram of a system 1500 including a device 1505 that supports repetition and time domain cover code based sounding reference signal resources for antenna switching in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit, to a UE, a configuration for a reference signal resource set for transmitting a reference signal for antenna switching, the configuration including an indication of a type of time division cover coding for repetitions of the reference signal and an indication of a type of frequency hopping and receive a set of repetitions of the reference signal over a determined reference signal resource according to the type of time division cover coding and based on the indication of the type of frequency hopping.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting repetition and time domain cover code based sounding reference signal resources for antenna switching).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
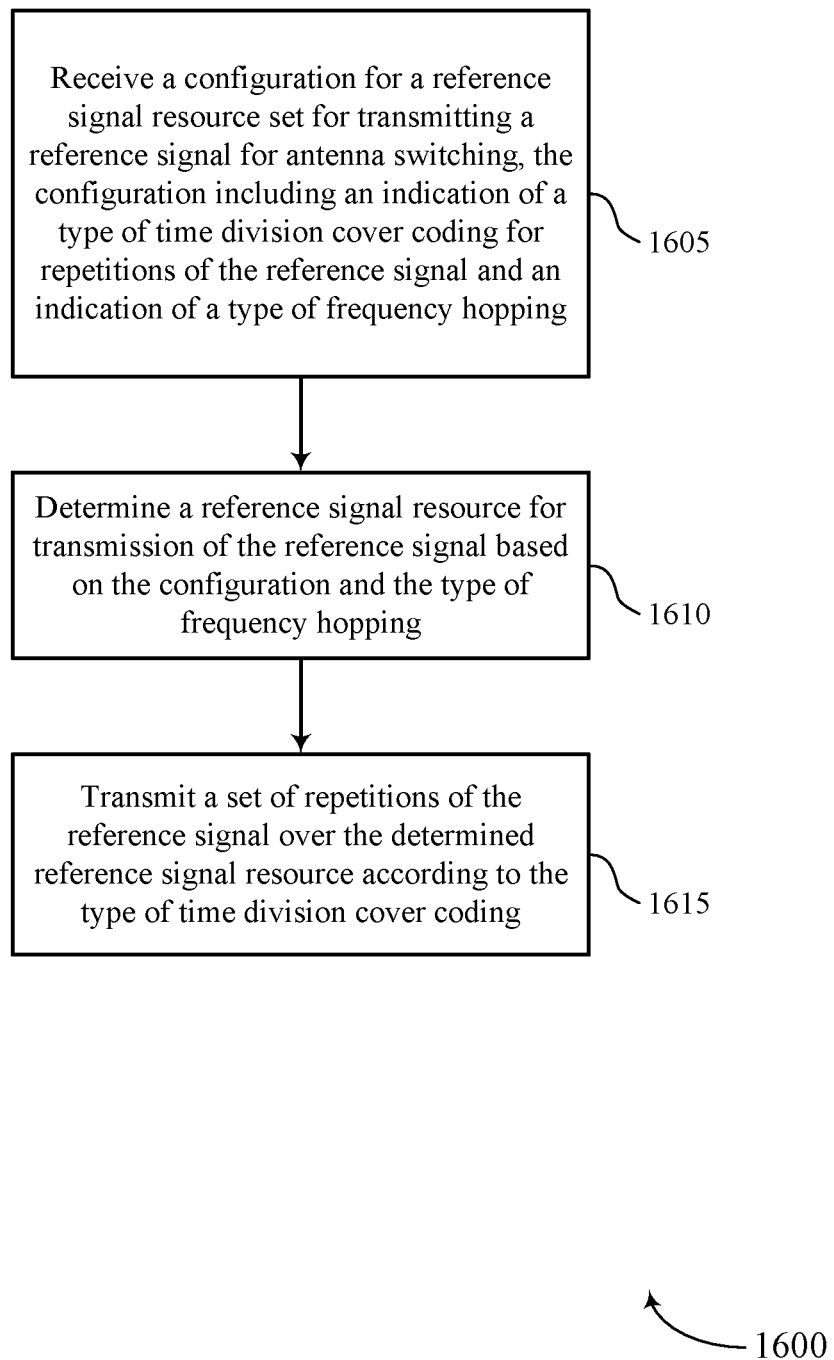
FIGS. 16 through 19 show flowcharts illustrating methods that support repetition and time domain cover code based sounding reference signal resources for antenna switching in accordance with aspects of the present disclosure.

FIG. 16 shows a flowchart illustrating a method 1600 that supports repetition and time domain cover code based sounding reference signal resources for antenna switching in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive a configuration for a reference signal resource set for transmitting a reference signal for antenna switching, the configuration including an indication of a type of time division cover coding for repetitions of the reference signal and an indication of a type of frequency hopping. The operations of 1605 may be performed according to the methods described herein. In some examples, aspects of the operations of 1605 may be performed by a configuration component as described with reference to FIGS. 8 through 11.

At 1610, the UE may determine a reference signal resource for transmission of the reference signal based on the configuration and the type of frequency hopping. The operations of 1610 may be performed according to the methods described herein. In some examples, aspects of the operations of 1610 may be performed by a resource component as described with reference to FIGS. 8 through 11.

At 1615, the UE may transmit a set of repetitions of the reference signal over the determined reference signal resource according to the type of time division cover coding. The operations of 1615 may be performed according to the methods described herein. In some examples, aspects of the operations of 1615 may be performed by a reference signal component as described with reference to FIGS. 8 through 11.

Figure 17:
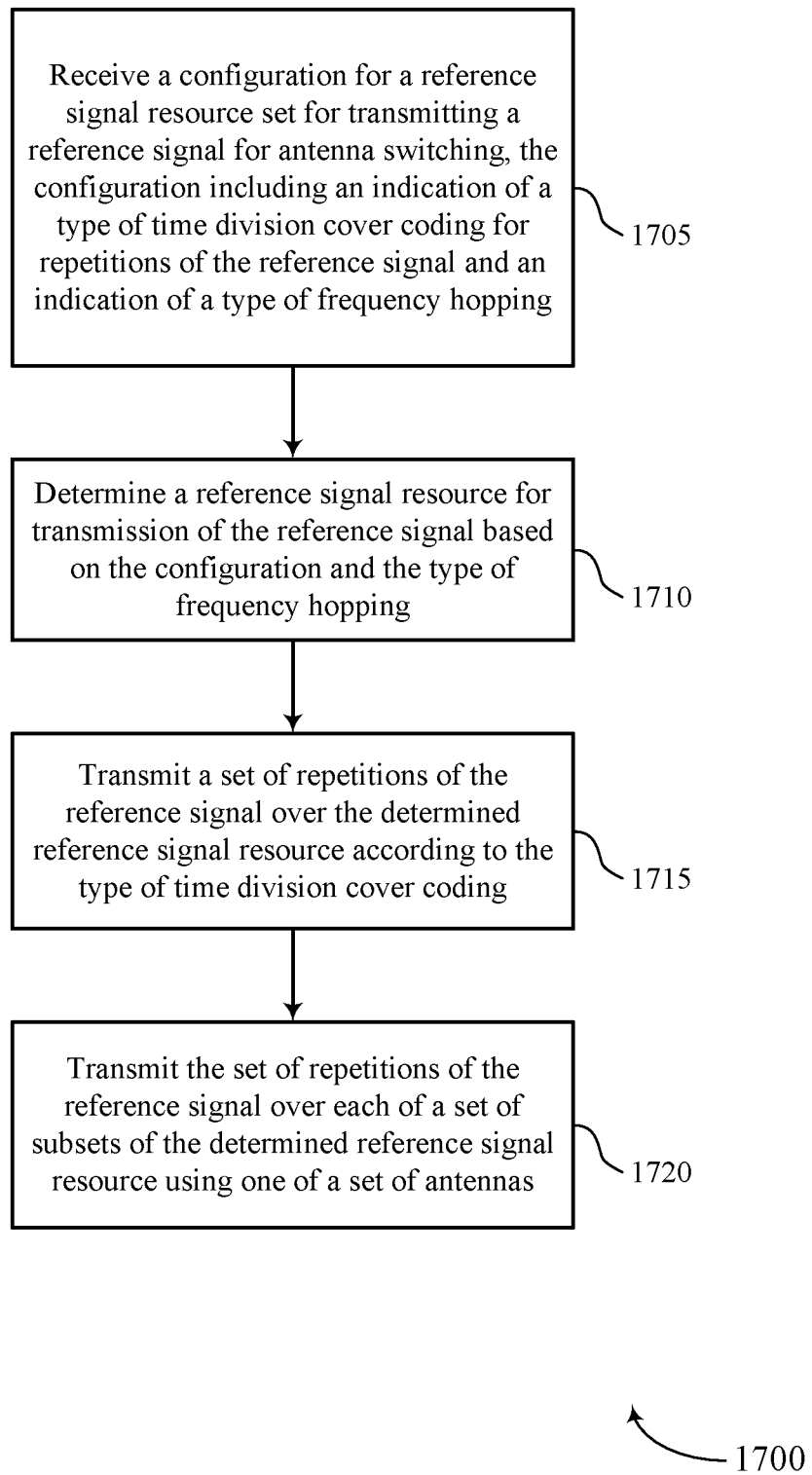

FIG. 17 shows a flowchart illustrating a method 1700 that supports repetition and time domain cover code based sounding reference signal resources for antenna switching in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may receive a configuration for a reference signal resource set for transmitting a reference signal for antenna switching, the configuration including an indication of a type of time division cover coding for repetitions of the reference signal and an indication of a type of frequency hopping. The operations of 1705 may be performed according to the methods described herein. In some examples, aspects of the operations of 1705 may be performed by a configuration component as described with reference to FIGS. 8 through 11.

At 1710, the UE may determine a reference signal resource for transmission of the reference signal based on the configuration and the type of frequency hopping. The operations of 1710 may be performed according to the methods described herein. In some examples, aspects of the operations of 1710 may be performed by a resource component as described with reference to FIGS. 8 through 11.

At 1715, the UE may transmit a set of repetitions of the reference signal over the determined reference signal resource according to the type of time division cover coding. The operations of 1715 may be performed according to the methods described herein. In some examples, aspects of the operations of 1715 may be performed by a reference signal component as described with reference to FIGS. 8 through 11.

At 1720, the UE may transmit the set of repetitions of the reference signal over each of a set of subsets of the determined reference signal resource using one of a set of antennas. The operations of 1720 may be performed according to the methods described herein. In some examples, aspects of the operations of 1720 may be performed by a reference signal component as described with reference to FIGS. 8 through 11.

Figure 18:
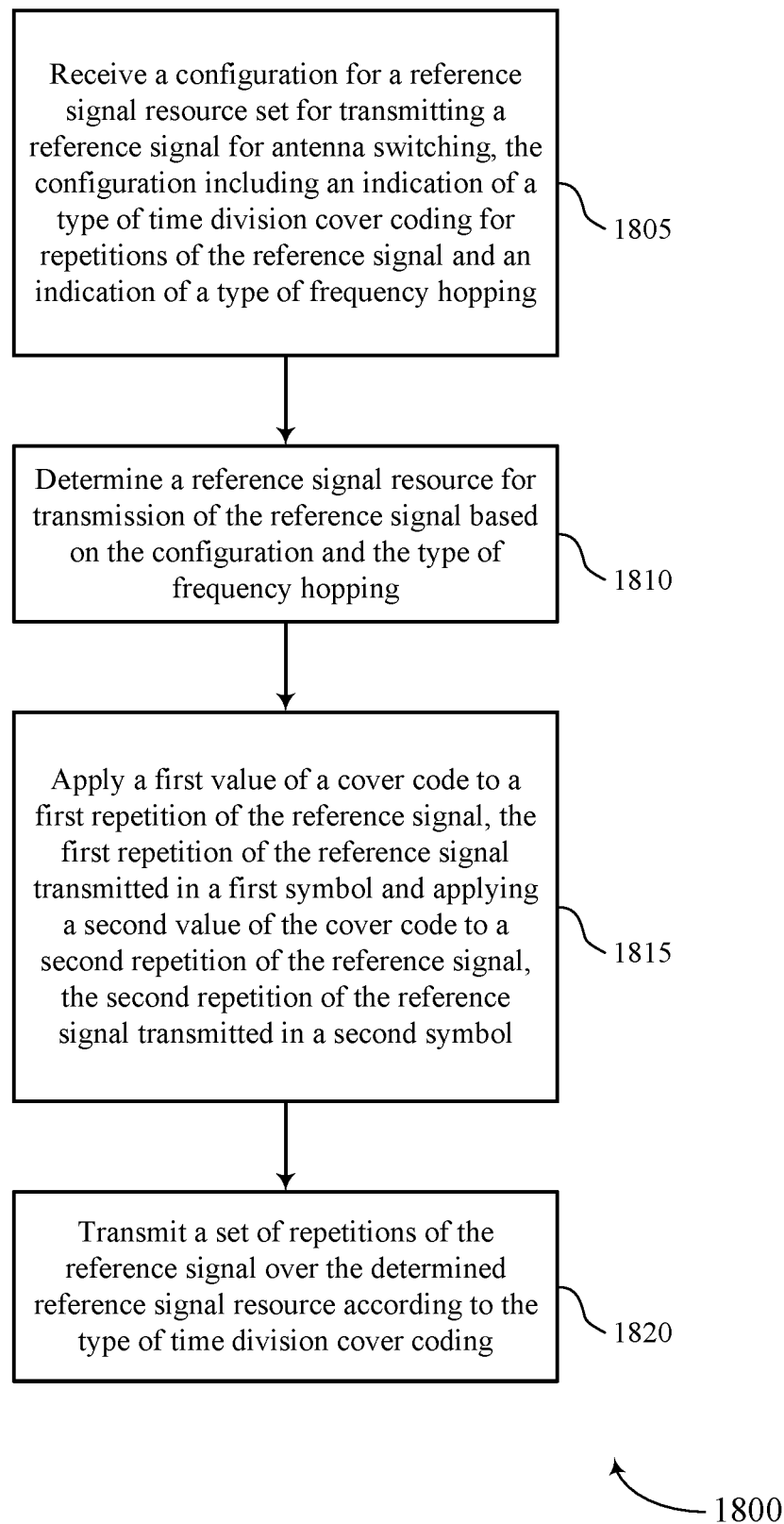

FIG. 18 shows a flowchart illustrating a method 1800 that supports repetition and time domain cover code based sounding reference signal resources for antenna switching in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may receive a configuration for a reference signal resource set for transmitting a reference signal for antenna switching, the configuration including an indication of a type of time division cover coding for repetitions of the reference signal and an indication of a type of frequency hopping. The operations of 1805 may be performed according to the methods described herein. In some examples, aspects of the operations of 1805 may be performed by a configuration component as described with reference to FIGS. 8 through 11.

At 1810, the UE may determine a reference signal resource for transmission of the reference signal based on the configuration and the type of frequency hopping. The operations of 1810 may be performed according to the methods described herein. In some examples, aspects of the operations of 1810 may be performed by a resource component as described with reference to FIGS. 8 through 11.

At 1815, the UE may apply a first value of a cover code to a first repetition of the reference signal, the first repetition of the reference signal transmitted in a first symbol and applying a second value of the cover code to a second repetition of the reference signal, the second repetition of the reference signal transmitted in a second symbol. The operations of 1815 may be performed according to the methods described herein. In some examples, aspects of the operations of 1815 may be performed by a cover code component as described with reference to FIGS. 8 through 11.

At 1820, the UE may transmit a set of repetitions of the reference signal over the determined reference signal resource according to the type of time division cover coding. The operations of 1820 may be performed according to the methods described herein. In some examples, aspects of the operations of 1820 may be performed by a reference signal component as described with reference to FIGS. 8 through 11.

Figure 19:
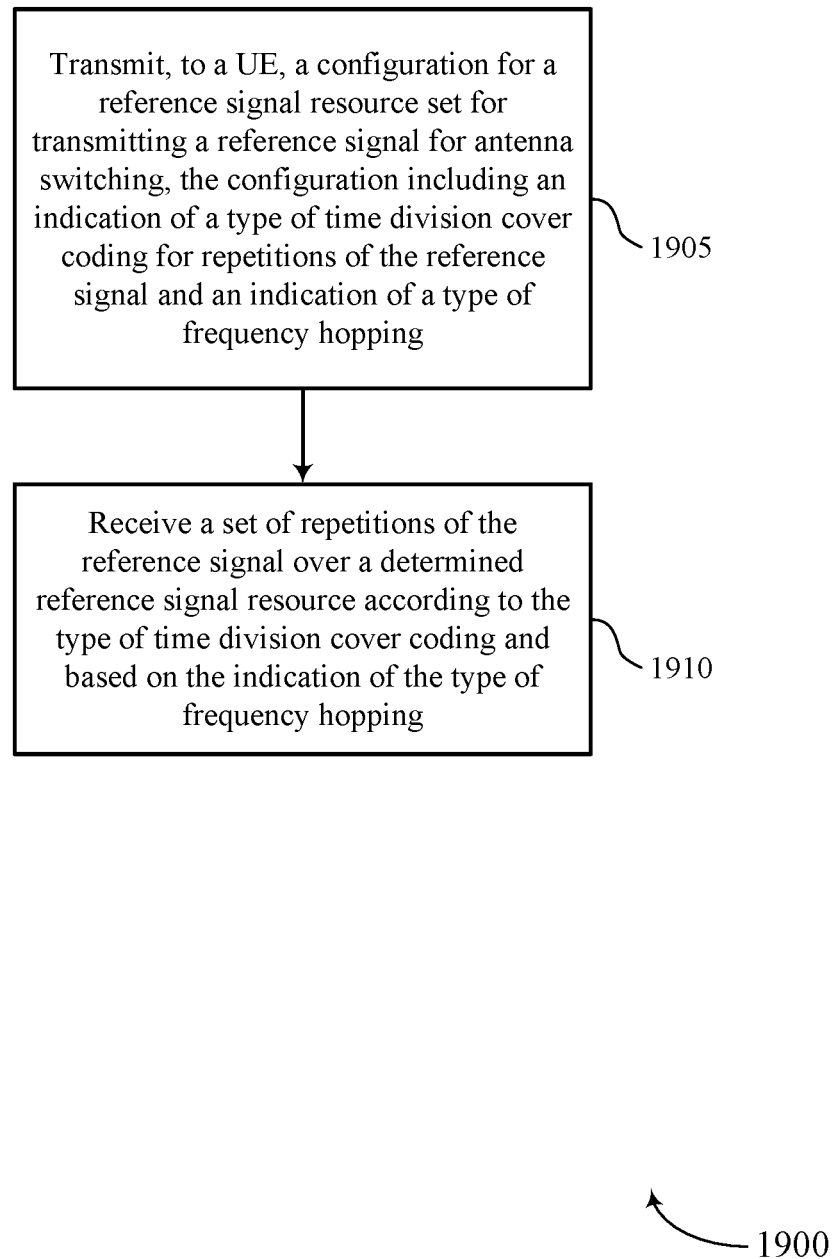

FIG. 19 shows a flowchart illustrating a method 1900 that supports repetition and time domain cover code based sounding reference signal resources for antenna switching in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1905, the base station may transmit, to a UE, a configuration for a reference signal resource set for transmitting a reference signal for antenna switching, the configuration including an indication of a type of time division cover coding for repetitions of the reference signal and an indication of a type of frequency hopping. The operations of 1905 may be performed according to the methods described herein. In some examples, aspects of the operations of 1905 may be performed by a configuration transmission component as described with reference to FIGS. 12 through 15.

At 1910, the base station may receive a set of repetitions of the reference signal over a determined reference signal resource according to the type of time division cover coding and based on the indication of the type of frequency hopping. The operations of 1910 may be performed according to the methods described herein. In some examples, aspects of the operations of 1910 may be performed by a reference signal reception component as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
one or more processors, and
memory coupled with the one or more processors, wherein the one or more processors are configured to cause the apparatus to:
receive a configuration for transmitting a reference signal for antenna switching, the configuration comprising an indication of a resource set for the reference signal and an indication of a type of frequency hopping, wherein the configuration is indicative of a quantity of symbols for repetition of the reference signal within each hop of a plurality of hops; and
transmit a set of repetitions of the reference signal within each hop of the plurality of hops over the resource set according to the type of frequency hopping and the quantity of symbols.

2. The apparatus of claim 1, wherein, to transmit the set of repetitions of the reference signal within each hop of the plurality of hops, the one or more processors are configured to cause the apparatus to:
transmit at least a first set of repetitions of the reference signal over each of a plurality of resources of the resource set using one of a plurality of antennas, wherein the first set of repetitions of the reference signal is within a hop of the plurality of hops.

3. The apparatus of claim 1, wherein the type of frequency hopping comprises intra-slot frequency hopping, and wherein, to transmit the set of repetitions of the reference signal within each hop of the plurality of hops, the one or more processors are configured to cause the apparatus to:
transmit a first set of repetitions of the reference signal over a first frequency resource within a first set of symbols of a slot, wherein the first set of repetitions of the reference signal is within a first hop of the plurality of hops; and
transmit a second set of repetitions of the reference signal over a second frequency resource within a second set of symbols of the slot, wherein the second set of repetitions of the reference signal is within a second hop of the plurality of hops.

4. The apparatus of claim 1, wherein the type of frequency hopping comprises inter-slot frequency hopping, and wherein, to transmit the set of repetitions of the reference signal within each hop of the plurality of hops, the one or more processors are configured to cause the apparatus to:
transmit a first set of repetitions of the reference signal over a first frequency resource within a first set of symbols of a first slot, wherein the first set of repetitions of the reference signal is within a first hop of the plurality of hops; and
transmit a second set of repetitions of the reference signal over a second frequency resource within a second set of symbols of a second slot, wherein the second set of repetitions of the reference signal is within a second hop of the plurality of hops.

5. The apparatus of claim 1, wherein the one or more processors are configured to cause the apparatus to:
apply a first value of a cover code to a first set of repetitions of the reference signal, wherein the first set of repetitions is transmitted in a first symbol, and wherein the first set of repetitions of the reference signal is within a first hop of the plurality of hops; and
apply a second value of the cover code to a second set of repetitions of the reference signal, wherein the second set of repetitions is transmitted in a second symbol, and wherein the second set of repetitions of the reference signal is within a second hop of the plurality of hops.

6. The apparatus of claim 5, wherein the first symbol and the second symbol are in a same slot.

7. The apparatus of claim 6, wherein the first symbol and the second symbol are not contiguous symbols of the same slot.

8. The apparatus of claim 5, wherein the first symbol is in a first slot and the second symbol is in a second slot.

9. The apparatus of claim 1, wherein the configuration for transmitting the reference signal comprises an indicator of a quantity of symbols of a guard period for the antenna switching.

10. The apparatus of claim 1, wherein the configuration for transmitting the reference signal comprises an indication of a time interlacing for the type of frequency hopping.

11. The apparatus of claim 1, wherein the reference signal is a sounding reference signal.

12. The apparatus of claim 11, wherein the configuration for transmitting the reference signal is periodic, aperiodic, or semi-persistent.

13. An apparatus for wireless communication, comprising:
one or more processors, and
memory coupled with the one or more processors, wherein the one or more processors are configured to cause the apparatus to:
transmit, to a user equipment (UE), a configuration for transmitting a reference signal for antenna switching, the configuration comprising an indication of a resource set for the reference signal and an indication of a type of frequency hopping, wherein the configuration is indicative of a quantity of symbols for repetition of the reference signal within each hop of a plurality of hops; and
receive a set of repetitions of the reference signal within each hop of the plurality of hops over the resource set according to the type of frequency hopping and the quantity of symbols.

14. The apparatus of claim 13, wherein, to receive the set of repetitions of the reference signal within each hop of the plurality of hops, the one or more processors configured to cause the apparatus to:
receive a first set of repetitions of the reference signal over a first frequency resource within a first set of symbols of a slot, wherein the first set of repetitions of the reference signal is within a first hop of the plurality of hops; and
receive a second set of repetitions of the reference signal over a second frequency resource within a second set of symbols of the slot, wherein the second set of repetitions of the reference signal is within a second hop of the plurality of hops.

15. The apparatus of claim 13, wherein the type of frequency hopping comprises inter-slot frequency hopping, and wherein, to receive the set of repetitions of the reference signal within each hop of the plurality of hops, the one or more processors are configured to cause the apparatus to:
receive a first set of repetitions of the reference signal over a first frequency resource within a first set of symbols of a first slot, wherein the first set of repetitions of the reference signal is within a first hop of the plurality of hops; and receive a second set of repetitions of the reference signal over a second frequency resource within a second set of symbols of a second slot, wherein the second set of repetitions of the reference signal is within a second hop of the plurality of hops.

16. The apparatus of claim 13, wherein, to receive the set of repetitions of the reference signal within each hop of the plurality of hops, the one or more processors are configured to cause the apparatus to:

receive the set of repetitions of the reference signal within each hop of the plurality of hops based at least in part on an application of a first value of a cover code to a first set of repetitions of the reference signal, wherein the first set of repetitions of the reference signal is within a first hop of the plurality of hops, and wherein the first set of repetitions is transmitted in a first symbol, and wherein reception of the set of repetitions of the reference signal within each hop of the plurality of hops is also based at least in part on an application of a second value of the cover code to a second set of repetitions of the reference signal, wherein the second set of repetitions of the reference signal is within a second hop of the plurality of hops, and wherein the second set of repetitions is transmitted in a second symbol.

17. The apparatus of claim 16, wherein the first symbol and the second symbol are in a same slot.

18. The apparatus of claim 17, wherein the first symbol and the second symbol are not contiguous symbols of the same slot.

19. The apparatus of claim 16, wherein the first symbol is in a first slot and the second symbol is in a second slot.

20. The apparatus of claim 13, wherein the configuration for transmitting the reference signal comprises an indicator of a quantity of symbols of a guard period for the antenna switching.

21. The apparatus of claim 20, wherein the UE is a first UE, and wherein the one or more processors are configured to cause the apparatus to:

transmit, to a second UE, a configuration for an uplink transmission by the second UE within the guard period for the antenna switching for the first UE.

22. The apparatus of claim 13, wherein the configuration for transmitting the reference signal comprises an indication of a time interlacing for the frequency hopping.

23. The apparatus of claim 13, wherein the reference signal is a sounding reference signal.

24. The apparatus of claim 23, wherein the configuration transmitting the reference signal is periodic, aperiodic, or semi-persistent.

25. The apparatus of claim 1, wherein the type of frequency hopping comprises intra-slot frequency hopping or inter-slot frequency hopping.

26. The apparatus of claim 13, wherein the type of frequency hopping configuration comprises intra-slot frequency hopping or inter-slot frequency hopping.

* * * * *